(12) United States Patent
Liang

(10) Patent No.: US 11,971,603 B2
(45) Date of Patent: Apr. 30, 2024

(54) SCOPE

(71) Applicants: Sintai Optical (Shenzhen) Co., Ltd., Guandong (CN); Asia Optical Co., Inc., Taichung (TW)

(72) Inventor: Yuan-Fan Liang, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 286 days.

(21) Appl. No.: 17/541,383

(22) Filed: Dec. 3, 2021

(65) Prior Publication Data

US 2022/0206250 A1 Jun. 30, 2022

(30) Foreign Application Priority Data

Dec. 30, 2020 (CN) .......................... 202011609224.4

(51) Int. Cl.
*G02B 7/10* (2021.01)
*G02B 9/14* (2006.01)
(Continued)

(52) U.S. Cl.
CPC ................ *G02B 7/10* (2013.01); *G02B 9/14* (2013.01); *G02B 9/34* (2013.01); *G02B 9/36* (2013.01);
(Continued)

(58) Field of Classification Search
CPC ... G02B 7/10; G02B 9/14; G02B 9/34; G02B 9/36; G02B 9/60; G02B 13/0095;
(Continued)

(56) References Cited

U.S. PATENT DOCUMENTS 6,577,449 B1 6/2003 Kanai
6,906,867 B2 6/2005 Nagata
(Continued)

FOREIGN PATENT DOCUMENTS

CN 1166616 A 12/1997
CN 101871747 * 10/2010 ............... F41G 1/38
(Continued)

OTHER PUBLICATIONS

Mansurov; Nasim, What is "Field Curvature", photographylife, [Par 1] (Year: 2019).*

*Primary Examiner* — Wyatt A Stoffa
*Assistant Examiner* — Ray Alexander Dean
(74) *Attorney, Agent, or Firm* — McClure, Qualey & Rodack, LLP

(57) ABSTRACT

A scope includes an objective lens system having refractive power, a relay lens system having refractive power, and an eyepiece system having refractive power. The relay lens system includes a first, a second, and a third lens groups. The second lens group includes a II-2-1 lens and a II-2-2 lens, and both of which are cemented. The third lens group includes a II-3-1 lens having a convex surface facing an object side and a II-3-2 lens having a convex surface facing an image side, and both of which are cemented. The second lens group and the third lens group can move along an optical axis to change a magnification of the relay lens system and thereby change a magnification of the scope. The objective lens system, the relay lens system, and the eyepiece system are arranged in order from the object side to the image side along the optical axis.

20 Claims, 24 Drawing Sheets

(51) Int. Cl.
*G02B 9/34* (2006.01)
*G02B 9/36* (2006.01)
*G02B 9/60* (2006.01)
*G02B 13/00* (2006.01)
*G02B 25/00* (2006.01)
*G02B 27/00* (2006.01)

(52) U.S. Cl.
CPC ............ *G02B 9/60* (2013.01); *G02B 13/0095* (2013.01); *G02B 25/001* (2013.01); *G02B 27/0081* (2013.01)

(58) Field of Classification Search
CPC .......................... G02B 25/001; G02B 27/0081; G02B 15/145; G02B 15/145131; G02B 23/00; G02B 15/1431
See application file for complete search history.

(56) References Cited

U.S. PATENT DOCUMENTS

| | | |
|---|---|---|
| 2004/0145818 A1 | 7/2004 | Ishii |
| 2013/0293968 A1 | 11/2013 | Miyazaki |

FOREIGN PATENT DOCUMENTS

| | | | | |
|---|---|---|---|---|
| CN | 101871747 A | | 10/2010 | |
| CN | 101871747 A | * | 10/2010 | ............... F41G 1/38 |
| CN | 103969814 A | | 8/2014 | |
| CN | 106019563 A | | 10/2016 | |
| CN | 107450151 A | | 12/2017 | |
| CN | 110543004 A | | 12/2019 | |
| CN | 110876605 A | | 3/2020 | |
| JP | 2003233007 A | | 8/2003 | |
| JP | 2015114625 A | | 6/2015 | |
| WO | 2020066224 A1 | | 4/2020 | |

* cited by examiner

SCOPE

BACKGROUND OF THE INVENTION

Field of the Invention

The invention relates to a scope.

Description of the Related Art

The current development trend of a scope is toward high magnification. Additionally, the scope is developed to have a relatively large field of view under the same magnification. However, the known scope can't satisfy such requirements. Therefore, the scope needs a new structure in order to meet the requirements of high magnification and a relatively large field of view under the same magnification at the same time.

BRIEF SUMMARY OF THE INVENTION

The invention provides a scope to solve the above problems. The scope of the invention is provided with characteristics of an increased magnification, an increased field of view under the same magnification, and still has a good optical performance.

The scope in accordance with an exemplary embodiment of the invention includes an objective lens system, a relay lens system, and an eyepiece system. The objective lens system is with refractive power. The relay lens system is with refractive power and includes a first lens group, a second lens group, and a third lens group. The eyepiece system is with refractive power. The first lens group is with positive refractive power. The second lens group includes a II-2-1 lens and a II-2-2 lens, and both of which are cemented and the II-2-1 lens is a meniscus lens. The third lens group includes a II-3-1 lens having a convex surface facing an object side and a II-3-2 lens having a convex surface facing an image side, and both of which are cemented. The second lens group and the third lens group can move along an optical axis to change a magnification of the relay lens system and thereby change a magnification of the scope. The objective lens system, the relay lens system, and the eyepiece system are arranged in order from the object side to the image side along the optical axis. The first lens group, the second lens group, and the third lens group are arranged in order from the object side to the image side along the optical axis. The II-2-1 lens, the II-2-2 lens, the II-3-1 lens, and the II-3-2 lens are arranged in order from the object side to the image side along the optical axis.

The scope in accordance with another exemplary embodiment of the invention includes an objective lens system, a relay lens system, and an eyepiece system. The objective lens system is with refractive power. The relay lens system is with refractive power and includes a first lens group, a second lens group, and a third lens group. The eyepiece system is with refractive power. The first lens group is with positive refractive power. The second lens group includes a II-2-1 lens and a II-2-2 lens having a convex surface facing an object side, and both of which are cemented and the II-2-1 lens is a meniscus lens. The third lens group includes a II-3-1 lens and a II-3-2 lens having a convex surface facing an image side, and both of which are cemented. The second lens group and the third lens group can move along an optical axis to change a magnification of the relay lens system and thereby change a magnification of the scope. The objective lens system, the relay lens system, and the eyepiece system are arranged in order from the object side to the image side along the optical axis. The first lens group, the second lens group, and the third lens group are arranged in order from the object side to the image side along the optical axis. The II-2-1 lens, the II-2-2 lens, the II-3-1 lens, and the II-3-2 lens are arranged in order from the object side to the image side along the optical axis. The scope satisfies: 20 degrees≤FOV×$M_{EL}$≤24 degrees; wherein FOV is a field of view of the scope and $M_{EL}$ is a magnification of the relay lens system.

In another exemplary embodiment, the eyepiece system includes a III-1 lens, a III-2 lens, and a III-3 lens, the III-1 lens and the III-2 lens is cemented, the first lens group includes a II-1-1 lens, wherein the II-1-1 lens is a plane-convex lens with positive refractive power and includes a plane surface facing the object side and a convex surface facing the image side, the second lens group is with positive refractive power, the II-2-1 lens includes a convex surface facing the object side and a concave surface facing the image side, the II-2-2 lens includes a convex surface facing the object side and another convex surface facing the image side, the third lens group is with positive refractive power, and the II-3-1 lens includes a convex surface facing the object side.

In yet another exemplary embodiment, the objective lens system includes a I-1 lens and a I-2 lens, the I-1 lens is a biconvex lens with positive refractive power and includes a convex surface facing the object side and another convex surface facing the image side, the I-2 lens is with negative refractive power and includes a concave surface facing the object side, and the I-1 lens and the I-2 lens are cemented.

In another exemplary embodiment, the objective lens system further includes a I-3 lens and a I-4 lens, the I-2 lens further includes a plane surface facing the image side, the I-3 lens is a plane-concave lens with negative refractive power and includes a concave surface facing the object side and a plane surface facing the image side, the I-4 lens is a plane-convex lens with positive refractive power and includes a convex surface facing the object side and a plane surface facing the image side, the I-3 lens and the I-4 lens are disposed between the I-2 lens and the relay lens system, and the I-3 lens and the I-4 lens are arranged in order from the object side to the image side along the optical axis.

In yet another exemplary embodiment, the objective lens system further includes a I-5 lens and two prisms, the I-5 lens is disposed between the object side and the I-1 lens, wherein the I-5 lens is a biconvex lens with positive refractive power and includes a convex surface facing the object side and another convex surface facing the image side, the I-2 lens further includes a concave surface facing the image side, and the prisms are disposed between the I-2 lens and the relay lens system.

In another exemplary embodiment, the objective lens system further includes a I-3 lens, the I-2 lens further includes a convex surface facing the image side, the I-3 lens is a plane-convex lens with positive refractive power and includes a convex surface facing the object side and a plane surface facing the image side, and the I-3 lens is disposed between the I-2 lens and the relay lens system.

In yet another exemplary embodiment, the objective lens system further includes a I-3 lens and a I-4 lens, the I-2 lens further includes a convex surface facing the image side, the I-3 lens is a meniscus lens with positive refractive power and includes a convex surface facing the object side and a concave surface facing the image side, the I-4 lens is a meniscus lens with negative refractive power and includes a convex surface facing the object side and a concave surface facing the image side, the I-3 lens and the I-4 lens are disposed between the I-2 lens and the relay lens system, and the I-3 lens and the I-4 lens are arranged in order from the object side to the image side along the optical axis.

In another exemplary embodiment, the scope satisfies at least one of the following conditions: $-10 \leq R_{101}/TTL_{EYE} \leq -5$; $1 \leq R_{101}/R_{122} \leq 4$; $0.5 \leq R_{OBJ1}/TTL_{OBJ} \leq 3$; $-3 \leq R_{92}/TTL_{ELMaxM} \leq -1$; $-3.3 \leq R_{122}/TTL_{EYE} \leq -1.8$; $0 \leq |R_{92}/R_{101}| \leq 0.25$; 20 degrees $\leq FOV \times M_{EL} \leq 24$ degrees; wherein $R_{101}$ is a radius of curvature of an object side surface of the lens closest to the object side in the eyepiece system, $TTL_{EYE}$ is an interval between the object side surface of the lens closest to the object side to an image side surface of the lens closest to the image side along the optical axis in the eyepiece system, $R_{122}$ is a radius of curvature of the image side surface of the lens closest to the image side in the eyepiece system, $R_{OBJ1}$ is a radius of curvature of an object side surface of the lens closest to the object side in the objective lens system, $TTL_{OBJ}$ is an interval from the object side surface of the lens closest to the object side to an image side surface of the lens closest to the image side along the optical axis in the objective lens system, $R_{92}$ is a radius of curvature of an image side surface of the lens closest to the image side in the relay lens system, $TTL_{ELMAXM}$ is an interval from an object side surface of the lens closest to the object side to the image side surface of the lens closest to the image side along the optical axis in the relay lens system when the magnification of the relay lens system is at maximum, FOV is a field of view of the scope, and $M_{EL}$ is a magnification of the relay lens system.

In yet another exemplary embodiment, the eyepiece system is with positive refractive power and a combination of the relay lens system and the eyepiece system is with negative refractive power, the III-1 lens is with negative refractive power and includes a concave surface facing the object side, the III-2 lens is with positive refractive power and includes a convex surface facing the image side, and the III-3 lens is a biconvex lens with positive refractive power and includes a convex surface facing the object side and another convex surface facing the image side.

In another exemplary embodiment, the III-1 lens includes a concave surface facing the image side, the III-2 lens includes a convex surface facing the object side, and a combination of the III-1 lens and the III-2 lens is with positive refractive power.

In yet another exemplary embodiment, the eyepiece system includes a III-1 lens, a III-2 lens, and a III-3 lens, the III-1 lens and the III-2 lens is cemented, the first lens group includes a II-1-1 lens, wherein the II-1-1 lens is a plane-convex lens with positive refractive power and includes a plane surface facing the object side and a convex surface facing the image side, the second lens group is with positive refractive power, the II-2-1 lens includes a convex surface facing the object side and a concave surface facing the image side, the II-2-2 lens further includes another convex surface facing the image side, the third lens group is with positive refractive power, and the II-3-1 lens includes a convex surface facing the object side.

In another exemplary embodiment, the eyepiece system is with positive refractive power and a combination of the relay lens system and the eyepiece system is with negative refractive power, the III-1 lens is with negative refractive power and includes a concave surface facing the object side, the III-2 lens is with positive refractive power and includes a convex surface facing the image side, the III-3 lens is a biconvex lens with positive refractive power and includes a convex surface facing the object side and another convex surface facing the image side, and the scope satisfies at least one of the following conditions: $-10 \leq R_{101}/TTL_{EYE} \leq -5$; $1 \leq R_{101}/R_{122} \leq 4$; $0.5 \leq R_{OBJ1}/TTL_{OBJ} \leq 3$; $-3 \leq R_{92}/TTL_{EYE} \leq -1$; $-3.3 \leq R_{122}/TTL_{EYE} \leq -1.8$; $0 \leq |R_{92}/R_{101}| \leq 0.25$; wherein $R_{101}$ is a radius of curvature of an object side surface of the lens closest to the object side in the eyepiece system, $TTL_{EYE}$ is an interval between the object side surface of the lens closest to the object side to an image side surface of the lens closest to the image side along the optical axis in the eyepiece system, $R_{122}$ is a radius of curvature of the image side surface of the lens closest to the image side in the eyepiece system, $R_{OBJ1}$ is a radius of curvature of an object side surface of the lens closest to the object side in the objective lens system, $TTL_{OBJ}$ is an interval from the object side surface of the lens closest to the object side to an image side surface of the lens closest to the image side along the optical axis in the objective lens system, $R_{92}$ is a radius of curvature of an image side surface of the lens closest to the image side in the relay lens system, and $TTL_{ELMaxM}$ is an interval from an object side surface of the lens closest to the object side to the image side surface of the lens closest to the image side along the optical axis in the relay lens system when the magnification of the relay lens system is at maximum.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
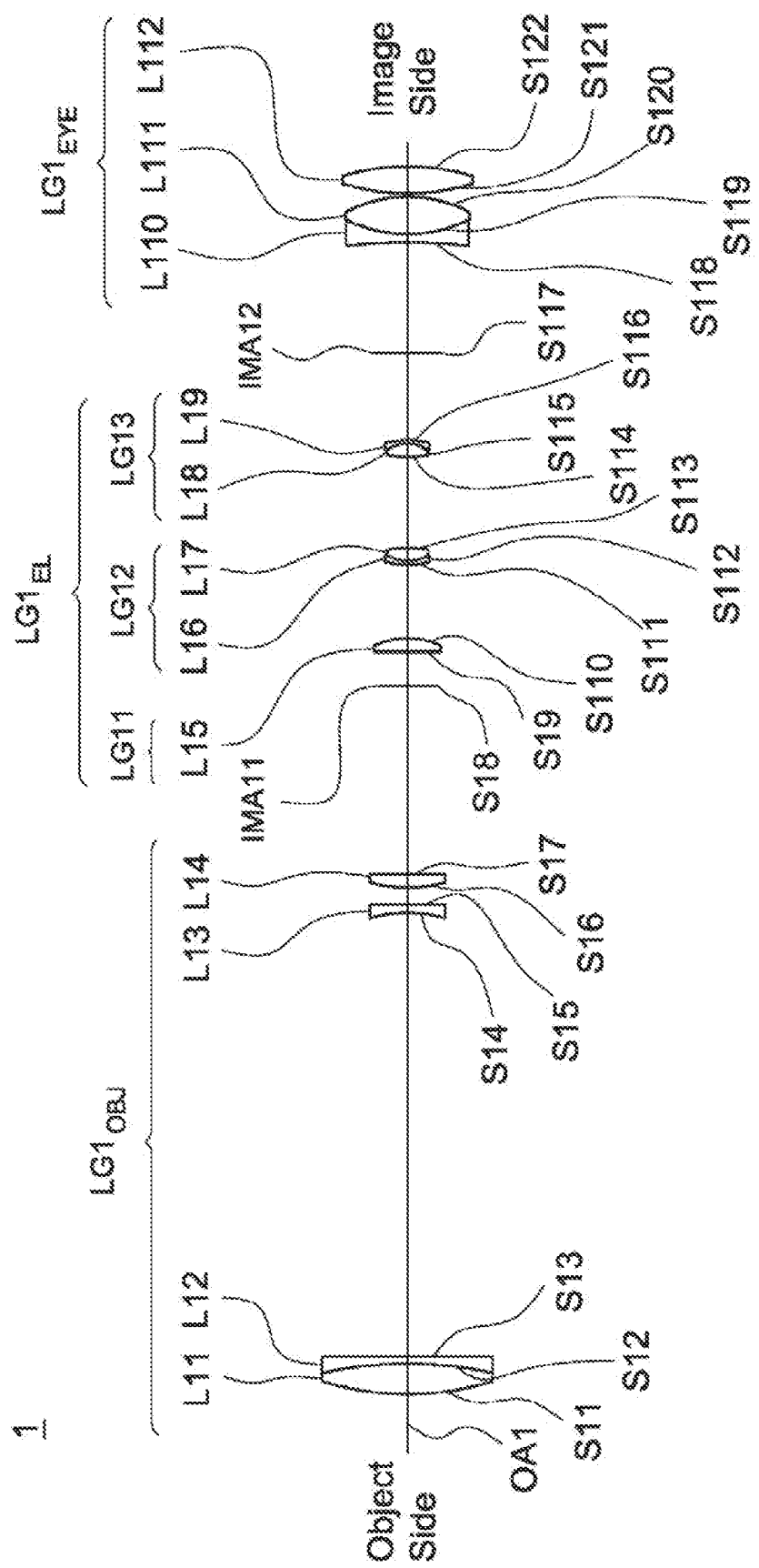
FIG. 1A is a lens layout diagram of a scope at minimum magnification in accordance with a first embodiment of the invention.

The following description is made for the purpose of illustrating the general principles of the invention and should not be taken in a limiting sense. The scope of the invention is best determined by reference to the appended claims.

The present invention provides a scope including an objective lens system, a relay lens system, and an eyepiece system. The objective lens system is with refractive power. The relay lens system is with refractive power and includes a first lens group, a second lens group, and a third lens group. The eyepiece system is with refractive power. The first lens group is with positive refractive power. The second lens group includes a II-2-1 lens and a II-2-2 lens, and both of which are cemented and the II-2-1 lens is a meniscus lens. The third lens group includes a II-3-1 lens having a convex surface facing an object side and a II-3-2 lens having a convex surface facing an image side, and both of which are cemented. The second lens group and the third lens group can move along an optical axis to change a magnification of the relay lens system and thereby change a magnification of the scope. The objective lens system, the relay lens system, and the eyepiece system are arranged in order from the object side to the image side along the optical axis. The first lens group, the second lens group, and the third lens group are arranged in order from the object side to the image side along the optical axis. The II-2-1 lens, the II-2-2 lens, the II-3-1 lens, and the II-3-2 lens are arranged in order from the object side to the image side along the optical axis.

The present invention provides another scope including an objective lens system, a relay lens system, and an eyepiece system. The objective lens system is with refractive power. The relay lens system is with refractive power and includes a first lens group, a second lens group, and a third lens group. The eyepiece system is with refractive power. The first lens group is with positive refractive power. The second lens group includes a II-2-1 lens and a II-2-2 lens having a convex surface facing an object side, and both of which are cemented and the II-2-1 lens is a meniscus lens. The third lens group includes a II-3-1 lens and a II-3-2 lens having a convex surface facing an image side, and both of which are cemented. The second lens group and the third lens group can move along an optical axis to change a magnification of the relay lens system and thereby change a magnification of the scope. The objective lens system, the relay lens system, and the eyepiece system are arranged in order from an object side to the image side along the optical axis. The first lens group, the second lens group, and the third lens group are arranged in order from the object side to the image side along the optical axis. The II-2-1 lens, the II-2-2 lens, the II-3-1 lens, and the II-3-2 lens are arranged in order from the object side to the image side along the optical axis. The scope satisfies: 20 degrees≤FOV×$M_{EL}$≤24 degrees; wherein FOV is a field of view of the scope and $M_{EL}$ is a magnification of the relay lens system.

It is worth noting that condition: 20 degrees≤FOV×$M_{EL}$≤24 degrees and the above-mentioned "a II-2-2 lens having a convex surface facing an object side" and "a II-3-1 lens having a convex surface facing an object side" have effects on the performance of the scope of the present invention. Specifically, any one of them can have effects of increasing field of view, correcting aberration, and correcting chromatic aberration.

Referring to Table 1, Table 3, Table 5, and Table 7, wherein Table 1, Table 3, Table 5, and Table 7 show optical specification in accordance with a first, second, third, and fourth embodiments of the invention, respectively.

FIG. 1A, FIG. 3A, FIG. 5A, and FIG. 7A are lens layout diagrams of the scope at minimum magnification in accordance with the first, second, third, and fourth embodiments of the invention, respectively. FIG. 1B, FIG. 3B, FIG. 5B, and FIG. 7B are lens layout diagrams of the scope at maximum magnification in accordance with the first, second, third, and fourth embodiments of the invention, respectively The objective lens systems $LG1_{OBJ}$, $LG2_{OBJ}$, $LG3_{OBJ}$, $LG4_{OBJ}$ include the I-1 lenses L11, L21, L31, L41 and I-2 lenses L12, L22, L32, L42, respectively. The relay lens systems $LG1_{EL}$, $LG2_{EL}$, $LG3_{EL}$, $LG4_{EL}$ include the first lens groups LG11, LG21, LG31, LG41, the second lens groups LG12, LG22, LG32, LG42, and the third lens groups LG13, LG23, LG33, LG43, respectively. The first lens groups LG11, LG21, LG31, LG41 include the II-1-1 lenses L15, L25, L35, LAS, respectively. The second lens groups LG12, LG22, LG32, LG42 include the II-2-1 lenses L16, L26, L36, L46 and the II-2-2 lenses L17, L27, L37, L47, respectively. The third lens groups LG13, LG23, LG33, LG43 include the II-3-1 lenses L18, L28, L38, L48 and the II-3-2 lenses L19, L29, L39, L49, respectively. The eyepiece systems $LG1_{EYE}$, $LG2_{EYE}$, $LG3_{EYE}$, $LG4_{EYE}$ include the III-1 lenses L110, L210, L310, L410, the III-2 lenses L111, L211, L311, L411, and the III-3 lenses L112, L212, L312, L412, respectively.

The I-1 lenses L11, L21, L31, L41 are biconvex lenses with positive refractive power and made of glass material, wherein the object side surfaces S11, S23, S31, S41 are convex surfaces, the image side surfaces S12, S24, S32, S42 are convex surfaces, and both of the object side surfaces S11, S23, S31, S41 and image side surfaces S12, S24, S32, S42 are spherical surfaces. The I-2 lenses L12, L22, L32, L42 are with negative refractive power and made of glass material, wherein the object side surfaces S12, S24, S32, S42 are concave surfaces and the object side surfaces S12, S24, S32, S42 are spherical surfaces. The I-1 lenses L11, L21, L31, L41 and the I-2 lenses L12, L22, L32, L42 are cemented, respectively. The II-1-1 lenses L15, L25, L35, L45 are plane-concave lenses with positive refractive power and made of glass material, wherein the object side surfaces S19, S211, S37, S49 are plane surfaces, the image side surfaces S110, S212, S38, S410 are convex surfaces, and the image side surfaces S110, S212, S38, S410 are plane surfaces. The II-2-1 lenses L16, L26, L36, L46 are meniscus lenses with negative refractive power and made of glass material, wherein the object side surfaces S111, S213, S39, S411 are convex surfaces, the image side surfaces S112, S214, S310, S412 are concave surfaces, and both of the object side surfaces S111, S213, S39, S411 and image side surfaces S112, S214, S310, S412 are spherical surfaces. The II-2-2 lenses L17, L27, L37, L47 are biconvex lenses with positive refractive power and made of glass material, wherein the object side surfaces S112, S214, S310, S412 are convex surfaces, the image side surfaces S113, S215, S311, S413 are convex surfaces, and both of the object side surfaces S112, S214, S310, S412 and image side surfaces S113, S215, S311, S413 are spherical surfaces. The II-2-1 lenses L16, L26, L36, L46 and the II-2-2 lenses L17, L27, L37, L47 are cemented, respectively. The II-3-1 lenses L18, L28, L38, L48 are biconvex lenses with positive refractive power and made of glass material, wherein the object side surfaces S114, S216, S312, S414 are convex surfaces, the image side surfaces S115, S217, S313, S415 are convex surfaces, and both of the object side surfaces S114, S216, S312, S414 and image side surfaces S115, S217, S313, S415 are spherical surfaces. The II-3-2 lenses L19, L29, L39, L49 are meniscus lenses with negative refractive power and made of glass material, wherein the object side surfaces S115, S217, S313, S415 are concave surfaces, the image side surfaces S116, S218, S314, S416 are convex surfaces, and both of the object side surfaces S115, S217, S313, S415 and image side surfaces S116, S218, S314, S416 are spherical surfaces. The II-3-1 lenses L18, L28, L38, L48 and the II-3-2 lenses L19, L29, L39, L49 are cemented, respectively. The III-1 lenses L110, L210, L310, L410 are biconcave lenses with negative refractive power and made of glass material, wherein the object side surfaces S118, S220, S316, S418 are concave surfaces, the image side surfaces S119, S221, S317, S419 are concave surfaces, and both of the object side surfaces S118, S220, S316, S418 and image side surfaces S119, S221, S317, S419 are spherical surfaces. The III-2 lenses L111, L211, L311, L411 are biconvex lenses with positive refractive power and made of glass material, wherein the object side surfaces S119, S221, S317, S419 are convex surfaces, the image side surfaces S120, S222, S318, S420 are convex surfaces, and both of the object side surfaces S119, S221, S317, S419 and image side surfaces S120, S222, S318, S420 are spherical surfaces. The III-1 lenses L110, L210, L310, L410 and the III-2 lenses L111, L211, L311, L411 are cemented, respectively. The III-3 lenses L112, L212, L312, L412 are biconvex lenses with positive refractive power and made of glass material, wherein the object side surfaces S121, S223, S319, S421 are convex surfaces, the image side surfaces S122, S224, S320, S422 are convex surfaces, and both of the object side surfaces S121, S223, S319, S421 and image side surfaces S122, S224, S320, S422 are spherical surfaces.

The eyepiece systems $LG1_{EYE}$, $LG2_{EYE}$, $LG3_{EYE}$, $LG4_{EYE}$ are with positive refractive power. The combinations of the relay lens systems $LG1_{EL}$, $LG2_{EL}$, $LG3_{EL}$, $LG4_{EL}$ and the eyepiece systems $LG1_{EYE}$, $LG2_{EYE}$, $LG3_{EYE}$, $LG4_{EYE}$ are with negative refractive power, respectively.

In addition, the scope 1, 2, 3, 4 satisfy at least one of the following conditions:

$$20 \text{ degrees} \leq FOV \times M_{EL} \leq 24 \text{ degrees}; \quad (1)$$

$$-10 \leq R_{101}/TTL_{EYE} \leq -5; \quad (2)$$

$$1 \leq R_{101}/R_{122} \leq 4; \quad (3)$$

$$0.5 \leq R_{OBJ1}/TTL_{OBJ} \leq 3; \quad (4)$$

$$-3 \leq R_{92}/TTL_{ELMaxM} \leq -1; \quad (5)$$

$$-3.3 \leq R_{122}/TTL_{EYE} \leq -1.8; \quad (6)$$

$$0 \leq |R_{92}/R_{101}| \leq 0.25; \quad (7)$$

wherein FOV is a field of view of the scope 1, 2, 3, 4 for the first to fourth embodiments, $M_{EL}$ is a magnification of the relay lens system $LG1_{EL}$, $LG2_{EL}$, $LG3_{EL}$, $LG4_{EL}$, for the first to fourth embodiments, $R_{101}$ is a radius of curvature of the object side surfaces S118, S220, S316, S418 of the lenses L110, L210, L310, L410 closest to the object side in the eyepiece systems $LG1_{EYE}$, $LG2_{EYE}$, $LG3_{EYE}$, $LG4_{EYE}$, for the first to fourth embodiments, $TTL_{EYE}$ is respectively an interval from the object side surfaces S118, S210, S310, S410 of the lenses L110, L210, L310, L410 closest to the object side to the image side surfaces S122, S224, S320, S422 of the lenses L112, L212, L312, L412 closest to the image side along the optical axes OA1, OA2, OA3, OA4 in the eyepiece systems $LG1_{EYE}$, $LG2_{EYE}$, $LG3_{EYE}$, $LG4_{EYE}$, for the first to fourth embodiments, $R_{122}$ is a radius of curvature of the image side surfaces S122, S224, S320, S422 of the lenses L112, L212, L312, L412 closest to the image side in the eyepiece systems $LG1_{EYE}$, $LG2_{EYE}$, $LG3_{EYE}$, $LG4_{EYE}$ for the first to fourth embodiments, $R_{OBJ1}$ is a radius of curvature of the object side surfaces S11, S21, S31, S41 of the lenses L11, L213, L31, L41 closest to the object side in the objective lens systems $LG1_{OBJ}$, $LG2_{OBJ}$, $LG3_{OBJ}$, $LG4_{OBJ}$ for the first to fourth embodiments, $TTL_{OBJ}$ is respectively an interval from the object side surfaces S11, S21, S31, S41 of the lenses L11, L213, L31, L41 closest to the object side to the image side surfaces S17, S29, S35, S47 of the lenses L14, P22, L33, L44 along the optical axes OA1, OA2, OA3, OA4 in the objective lens systems $LG1_{OBJ}$, $LG2_{OBJ}$, $LG3_{OBJ}$, $LG4_{OBJ}$ for the first to fourth embodiments, $R_{92}$ is a radius of curvature of the image side surfaces S116, S218, S314, S416 of the lenses L19, L29, L39, L49 closest to the image side in the relay lens systems $LG1_{EL}$, $LG2_{EL}$, $LG3_{EL}$, $LG4_{EL}$ for the first to fourth embodiments, and $TTL_{ELMaxM}$ is respectively an interval from the object side surfaces S19, S211, S37, S49 of the lenses L15, L25, L35, L45 closest to the object side to the image side surfaces S116, S218, S314, S416 of the lenses L19, L29, L39, L49 closest to the image side along the optical axes OA1, OA2, OA3, OA4 in the relay lens systems $LG1_{EL}$, $LG2_{EL}$, $LG3_{EL}$, $LG4_{EL}$ for the first to fourth embodiments. With the scopes 1, 2, 3, 4 satisfying at least one of the above conditions (1)-(7), the field of view can be effectively increased, the aberration can be effectively corrected, and the chromatic aberration can be effectively corrected.

Figure 1B:
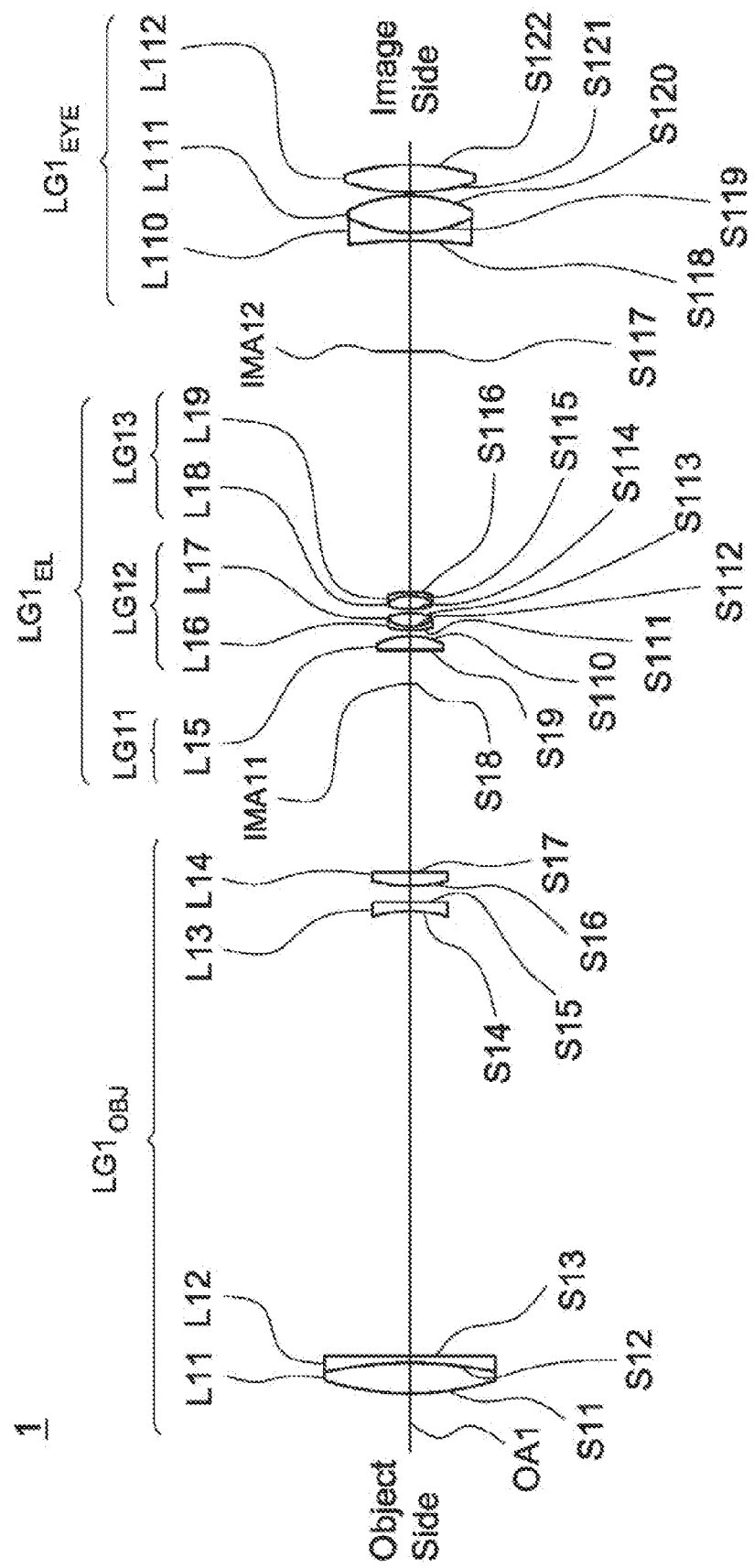
FIG. 1B is a lens layout diagram of a scope at maximum magnification in accordance with the first embodiment of the invention.
Figure 2A:
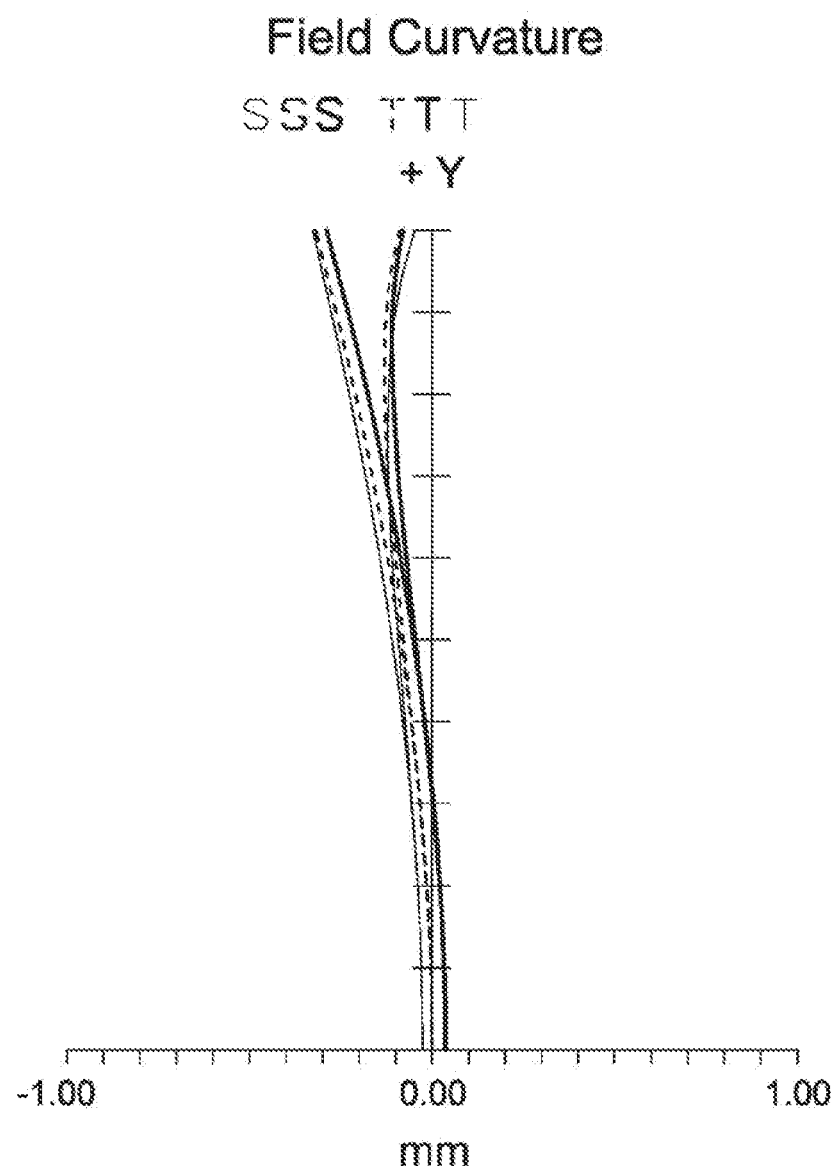
FIG. 2A and FIG. 2B depict a field curvature diagram and a distortion diagram of the scope at minimum magnification in accordance with the first embodiment of the invention, respectively.
Figure 2B:
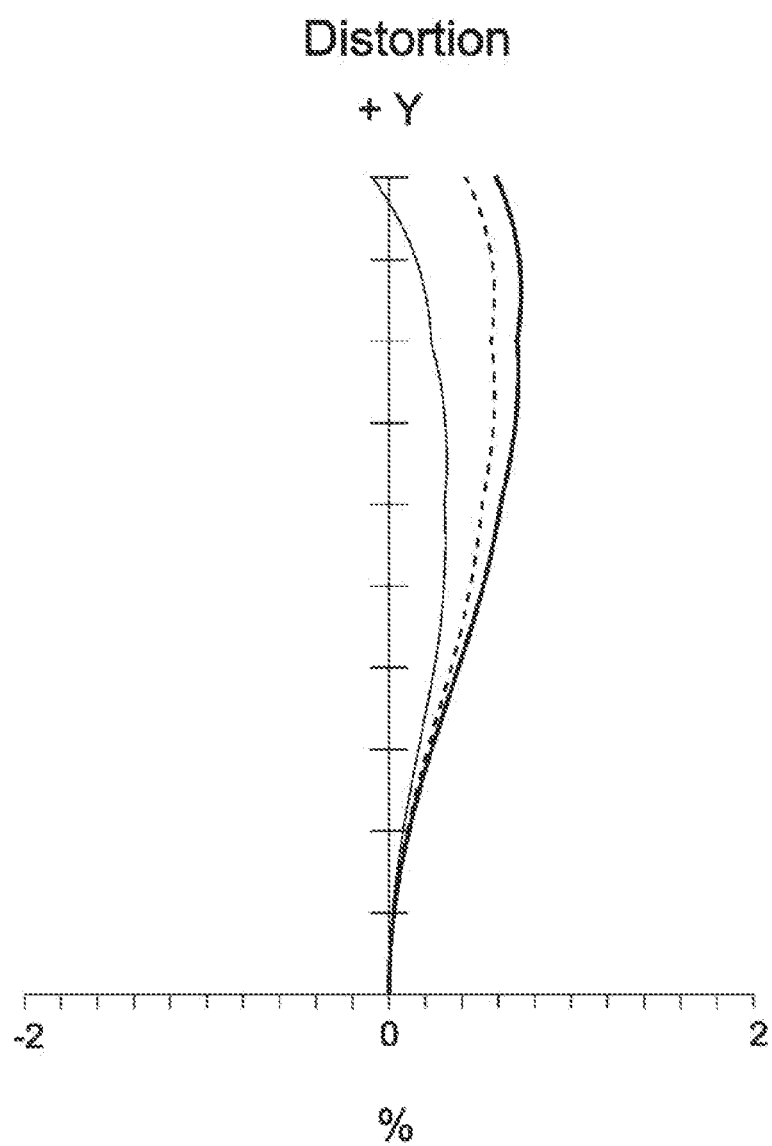
Figure 2C:
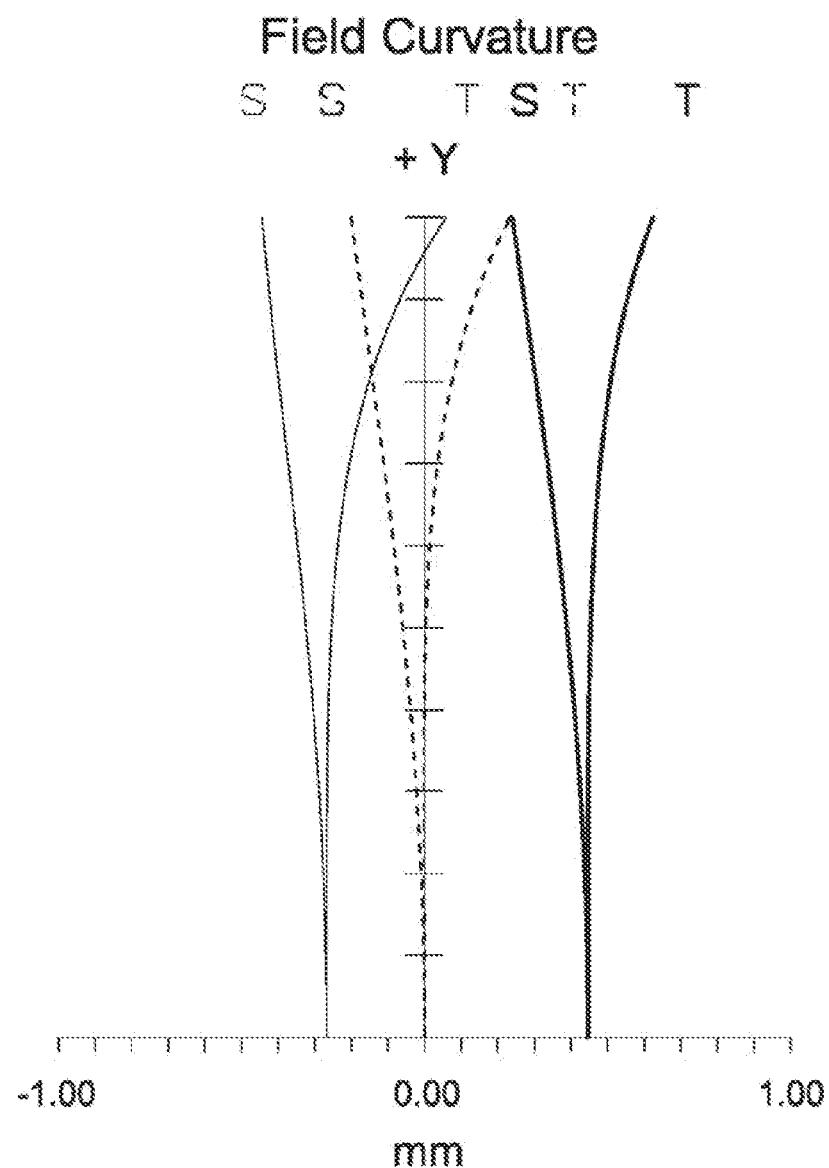
FIG. 2C and FIG. 2D depict a field curvature diagram and a distortion diagram of the scope at maximum magnification in accordance with the first embodiment of the invention, respectively.
Figure 2D:
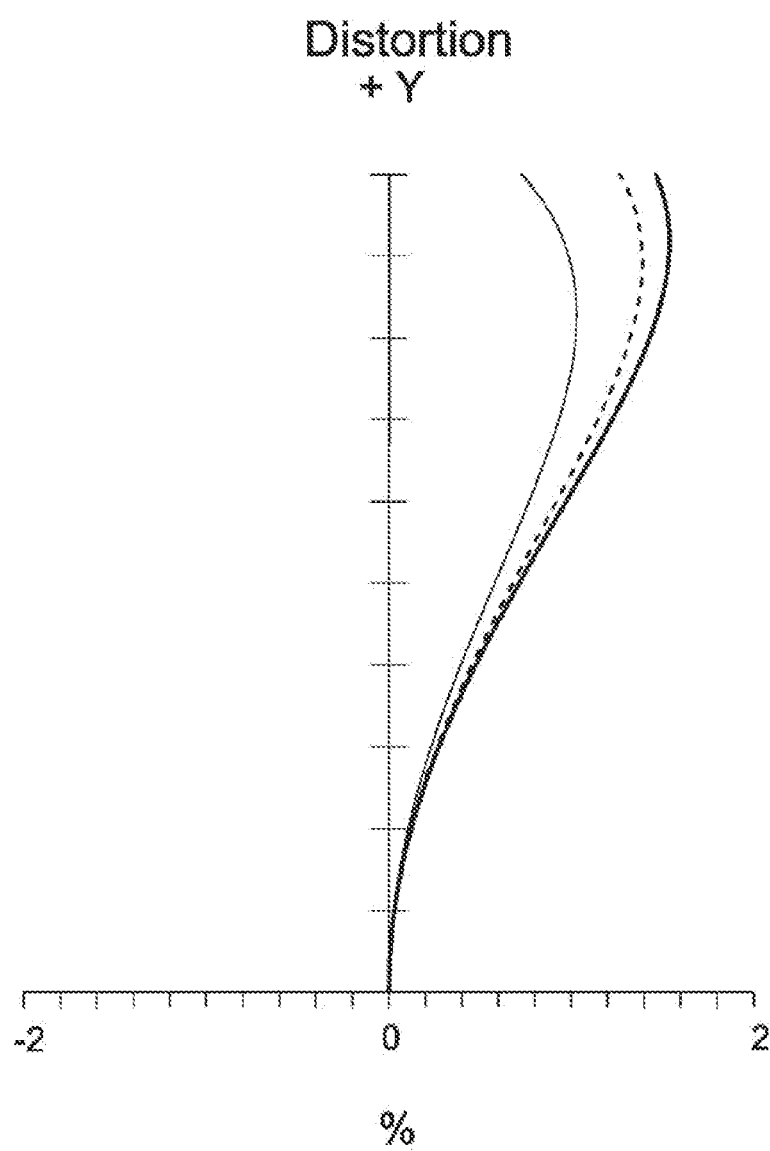

A detailed description of a scope in accordance with a first embodiment of the invention is as follows. Referring to FIG. 1A and FIG. 1B, FIG. 1A is a lens layout diagram of a scope at minimum magnification in accordance with a first embodiment of the invention and FIG. 1B is a lens layout diagram of a scope at maximum magnification in accordance with the first embodiment of the invention. The scope 1 includes an objective lens system $LG1_{OBJ}$, a relay lens system $LG1_{EL}$, and an eyepiece system $LG1_{EYE}$, all of which are arranged in order from an object side to an image side along an optical axis OA1. The objective lens system $LG1_{OBJ}$ includes a I-1 lens L11, a I-2 lens L12, a I-3 lens L13, and a I-4 lens L14. The I-1 lens L11 and the I-2 lens L12 are cemented. The relay lens system $LG1_{EL}$ includes a first lens group LG11, a second lens group LG12, and a third lens group LG13, all of which are arranged in order from the object side to the image side along the optical axis OA1. The first lens group LG11 includes a II-1-1 lens L15. The second lens group LG12 includes a II-2-1 lens L16 and a II-2-2 lens L17. The II-2-1 lens L16 and the II-2-2 lens L17 are cemented. The third lens group LG13 includes a II-3-1 lens L18 and a II-3-2 lens L19. The II-3-1 lens L18 and the II-3-2 lens L19 are cemented. The eyepiece system LG1$_{EYE}$ includes a III-1 lens L110, a III-2 lens L111, and a III-3 lens L112. The III-1 lens L110 and the III-2 lens L111 are cemented. The I-1 lens L11, the I-2 lens L12, the I-3 lens L13, the I-4 lens L14, the II-1-1 lens L15, the II-2-1 lens L16, the II-2-2 lens L17, the II-3-1 lens L18, the II-3-2 lens L19, the III-1 lens L110, the III-2 lens L111, and the III-3 lens L112 are arranged in order from the object side to the image side along the optical axis OA1. The second lens group LG12 and the third lens group LG13 can move along the optical axis OA1 to change an interval of the first lens group LG11 and the second lens group LG12, an interval of the second lens group LG12 and the third lens group LG13, and an interval of the third lens group LG13 and the second image plane IMA12, so that the magnification of the relay lens system LG1$_{EL}$ is changed and thereby changed the magnification of the scope 1. In the first embodiment, the magnification of the relay lens system LG1$_{EL}$ is variable from 1 to 4 times, that is, the minimum magnification is 1 times, and the maximum magnification is 4 times. The field of view is different under different magnifications for the scope. Taking condition (1): 20 degrees FOV×M$_{EL}$≤24 degrees as an example. Assuming that the best embodiment is FOV×M$_{EL}$=23 (is not limited), when the magnification of the relay lens system is equal to 1 (i.e. M$_{EL}$=1), the field of view of the scope is equal to 23 degrees (i.e. 23/1=23). On the contrary, when the magnification of the relay lens system is equal to 4 (i.e. M$_{EL}$=4), the field of view of the scope is equal to 5.75 degrees (i.e. 23/4=5.75). It can be seen that the field of view of the scope is about 5.75 degrees to 23 degrees under different magnifications of the relay lens system. The objective lens system LG1$_{OBJ}$ has a magnification of 5 times. In operation, the light from the object side first passes through the objective lens group LG1$_{OBJ}$ to be magnified by 5 times, forms an inverted image on the first image plane IMA11, then passes through the relay lens system LG1$_{EL}$ to be magnified by 1 to 4 times, forms an erect image on the second image plane IMA12, and finally passes through the eyepiece system LG1$_{EYE}$ and imaged on human's eye. In the first embodiment, the magnification of the scope 1 is 5 times to 20 times.

According to the foregoing, wherein: the I-2 lens L12 is a plane-concave lens, wherein the image side surface S13 is a plane surface; the I-3 lens L13 is plane-concave lens with negative refractive power and made of glass material, wherein the object side surface S14 is a concave surface, the image side surface S15 is a plane surface, and the object side surface S14 is a spherical surface; and the I-4 lens is a plane-convex lens with positive refractive power and made of glass material, wherein the object side surface S16 is a convex surface, the image side surface S17 is a plane surface, and the object side surface S16 is a spherical surface.

With the above design of the objective lens system LG1$_{OBJ}$, relay lens system LG1$_{EL}$, eyepiece system LG1$_{EYE}$, and at least one of the conditions (1)-(7) satisfied, the scope 1 can have an effective increased field of view, an effective corrected aberration, and an effective corrected chromatic aberration.

Table 1 shows the optical specification of the scope 1 in FIG. 1A and FIG. 1B.

TABLE 1

| Surface Number | Radius of Curvature (mm) | Thickness (mm) | Nd | Vd | Effective Focal Length (mm) | Remark |
|---|---|---|---|---|---|---|
| S11 | 84.062 | 9 | 1.517 | 64.17 | 95.277 | L11 |
| S12 | −114.526 | 2 | 1.64 | 34.47 | −179.007 | L12 |
| S13 | ∞ | 131 | | | | |
| S14 | −40.06 | 2.5 | 1.517 | 64.17 | −77.515 | L13 |
| S15 | ∞ | 5 | | | | |
| S16 | 42.525 | 3.96 | 1.517 | 64.17 | 82.285 | L14 |
| S17 | ∞ | 55.517 | | | | |
| S18 | ∞ | 10 | | | | IMA11 |
| S19 | ∞ | 4 | 1.517 | 64.2 | 44.602 | L15 |
| S110 | −23.05 | 21.73921(1× Magnification) 1.81226(4× Magnification) | | | | |
| S111 | 28.44 | 1 | 1.648 | 33.84 | −28.632 | L16 |
| S112 | 11.07 | 4 | 1.517 | 64.2 | 15.687 | L17 |
| S113 | −26.56 | 26.55932(1× Magnification) 1.23115(4× Magnification) | | | | |
| S114 | 26.56 | 4 | 1.517 | 64.2 | 15.687 | L18 |
| S115 | −11.07 | 1 | 1.648 | 33.84 | −28.632 | L19 |
| S116 | −28.44 | 25.65853(1× Magnification) 70.91365(4× Magnification) | | | | |
| S117 | ∞ | 32.66 | | | | IMA12 |
| S118 | −179.7 | 2.5 | 1.717 | 29.5 | −44.908 | L110 |
| S119 | 39.48 | 11 | 1.517 | 64.2 | 40.100 | L111 |
| S120 | −39.48 | 1 | | | | |
| S121 | 64.22 | 8 | 1.517 | 64.2 | 63.480 | L112 |
| S122 | −64.22 | 90 | | | | |

Table 2 shows the parameters and condition values for conditions (1)-(7) in accordance with the first embodiment of the invention. It can be seen from Table 2 that the scope 1 of the first embodiment satisfies the conditions (1)-(7).

TABLE 2

| | | | | | | |
|---|---|---|---|---|---|---|
| FOV | 5-24 degrees | M$_{EL}$ | 1-4 | TTL$_{EYE}$ | 22.5 mm | |
| R$_{OBJ1}$ | 84.062 mm | TTL$_{OBJ}$ | 153.46 mm | TTL$_{ELMaxM}$ | 17.04341 mm | |
| FOV × M$_{EL}$ | 23 degrees | R$_{101}$/TTL$_{EYE}$ | −7.98667 | R$_{101}$/R$_{122}$ | 2.798194 | |
| R$_{OBJ1}$/TTL$_{OBJ}$ | 0.547778 | R$_{92}$/TTL$_{ELMaxM}$ | −1.66868 | R$_{122}$/TTL$_{EYE}$ | −2.85442 | |
| \| R$_{92}$/R$_{101}$ \| | 0.158264 | | | | | |

In addition, the scope 1 of the first embodiment can meet the requirements of optical performance as seen in FIGS. 2A-2D. It can be seen from FIG. 2A that the field curvature of tangential direction and sagittal direction in the scope 1 at minimum magnification of the first embodiment ranges from −0.4 mm to 0.1 mm. It can be seen from FIG. 2B that the distortion in the scope 1 at minimum magnification of the first embodiment ranges from −0.2% to 0.8%. It can be seen from FIG. 2C that the field curvature of tangential direction and sagittal direction in the scope 1 at maximum magnification of the first embodiment ranges from −0.5 mm to 0.7 mm. It can be seen from FIG. 2D that the distortion in the scope 1 at maximum magnification of the first embodiment ranges from 0% to 1.6%. It is obvious that the field curvature and the distortion of the scope 1 of the first embodiment can be corrected effectively. Therefore, the scope 1 of the first embodiment is capable of good optical performance.

Figure 3A:
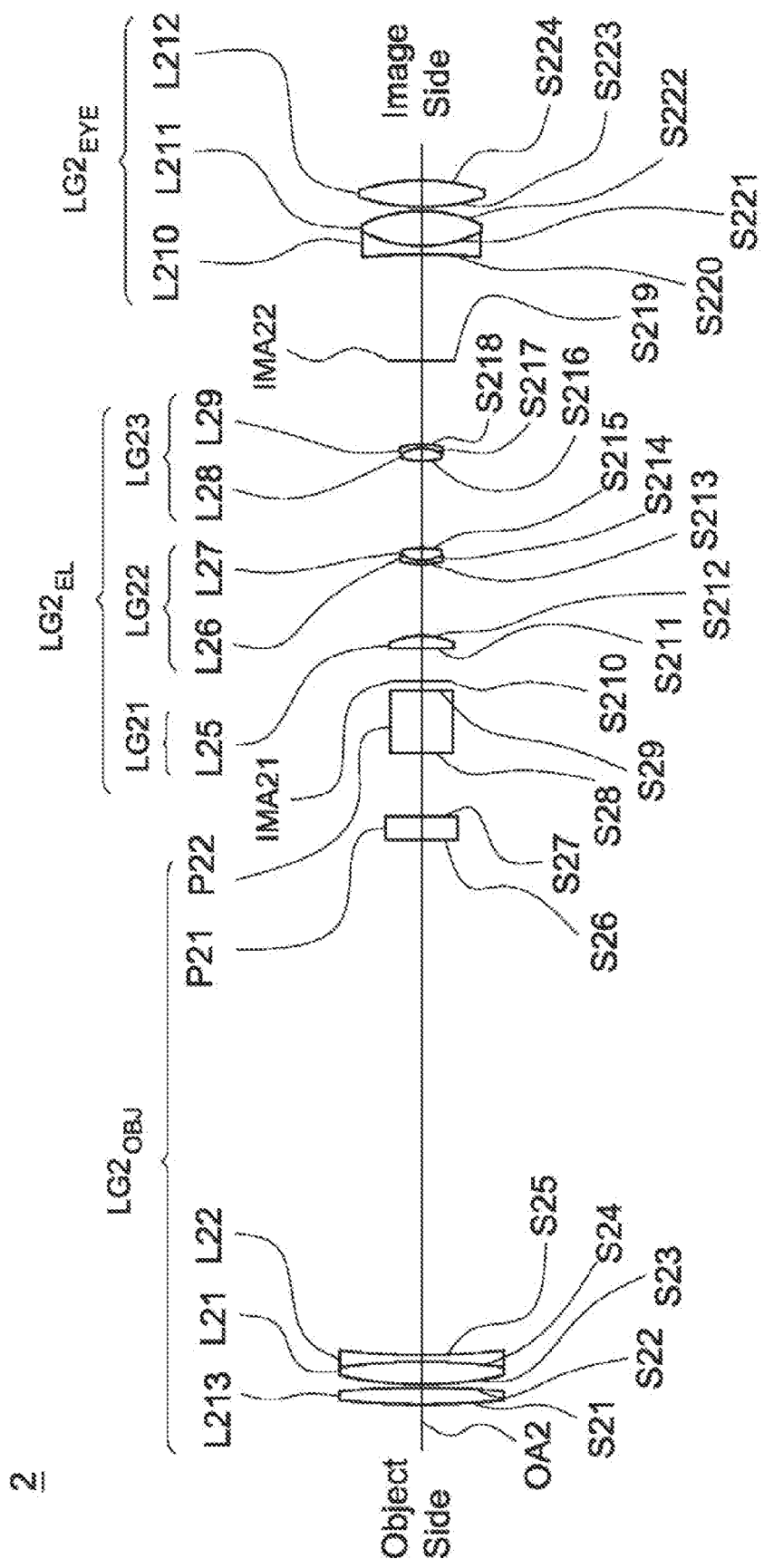
FIG. 3A is a lens layout diagram of a scope at minimum magnification in accordance with a second embodiment of the invention.
Figure 3B:
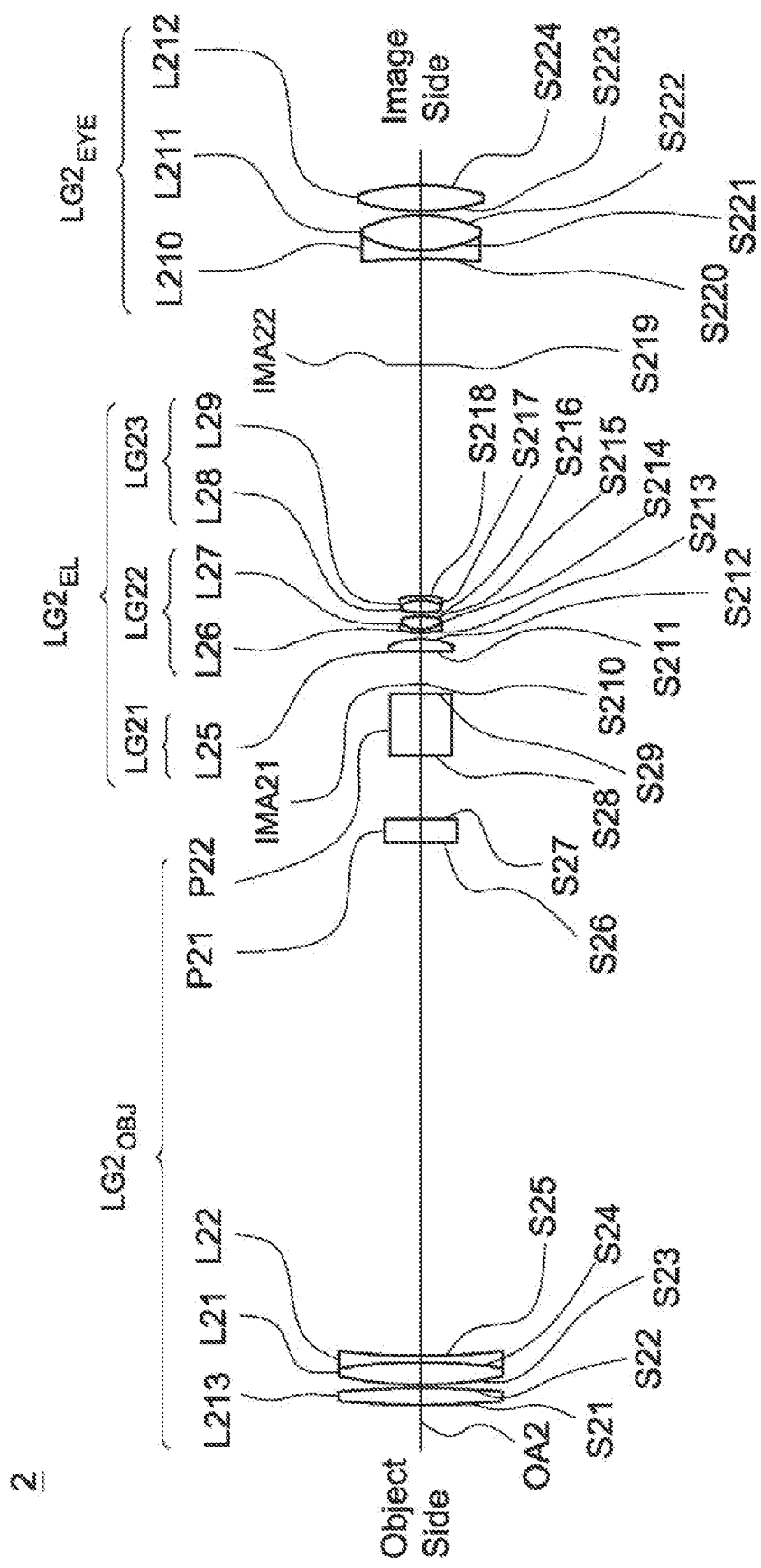
FIG. 3B is a lens layout diagram of a scope at maximum magnification in accordance with the second embodiment of the invention.
Figure 4A:
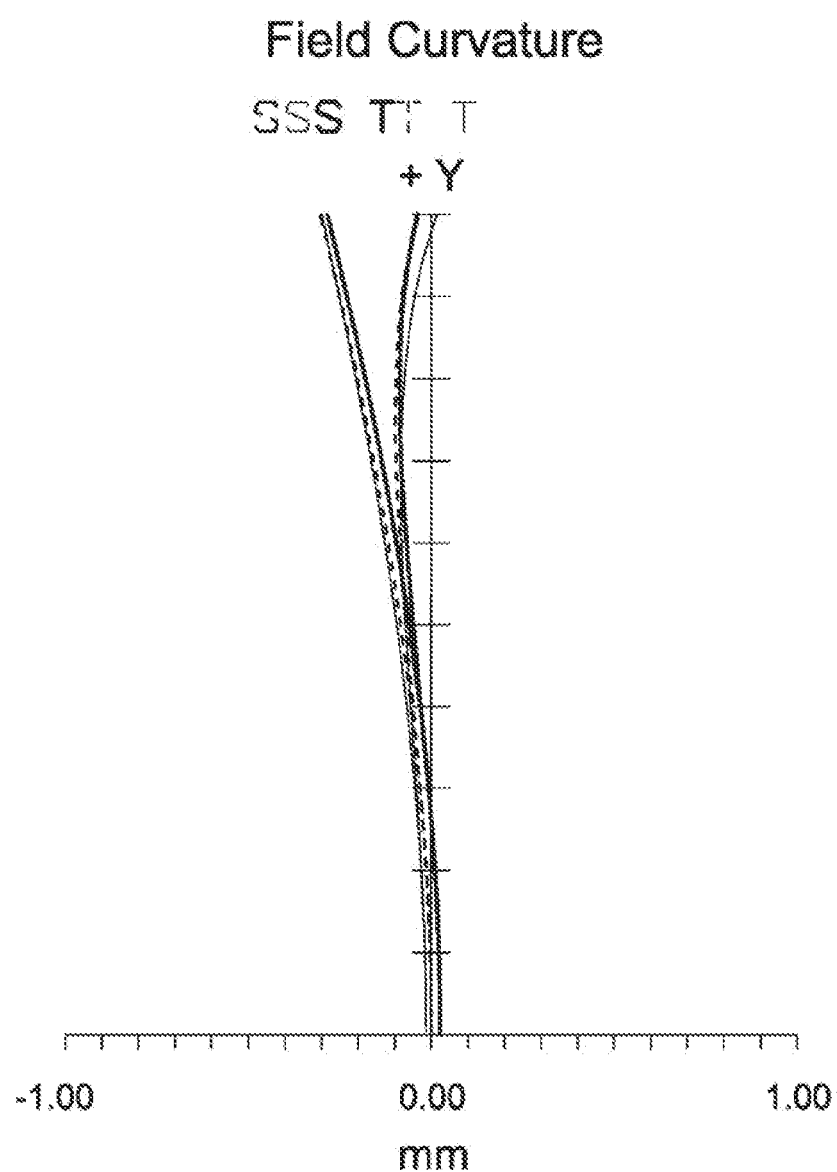
FIG. 4A and FIG. 4B depict a field curvature diagram and a distortion diagram of the scope at minimum magnification in accordance with the second embodiment of the invention, respectively.
Figure 4B:
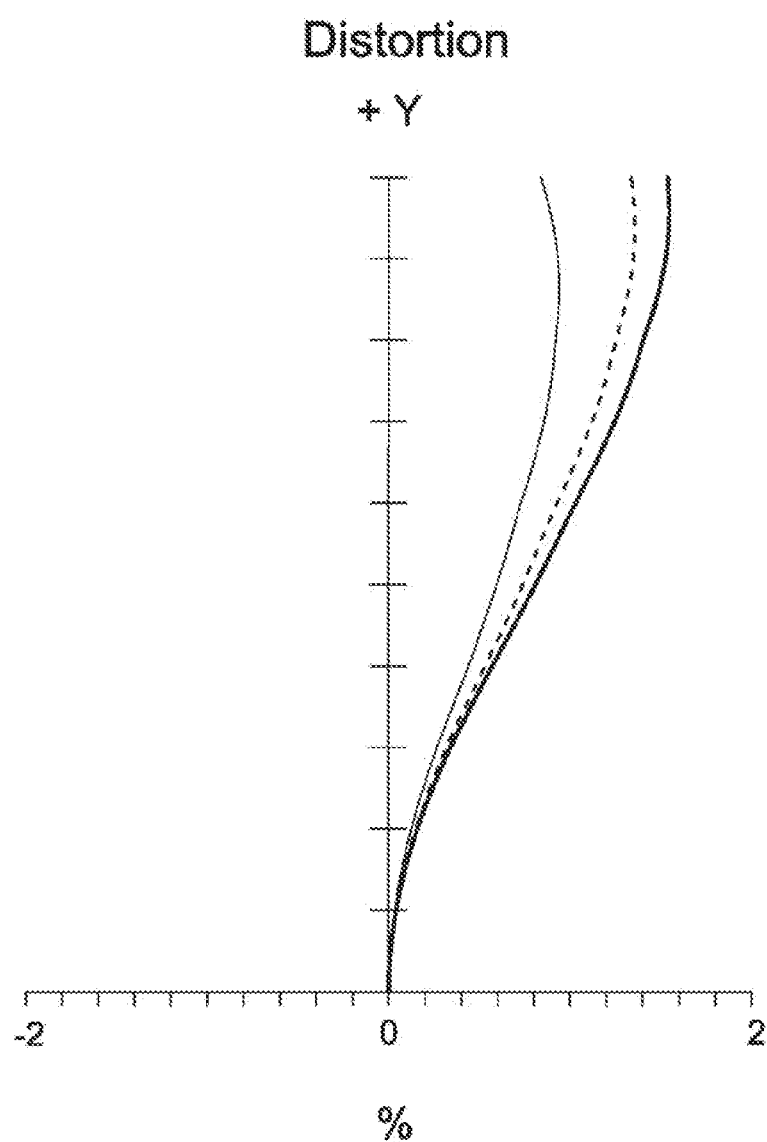
Figure 4C:
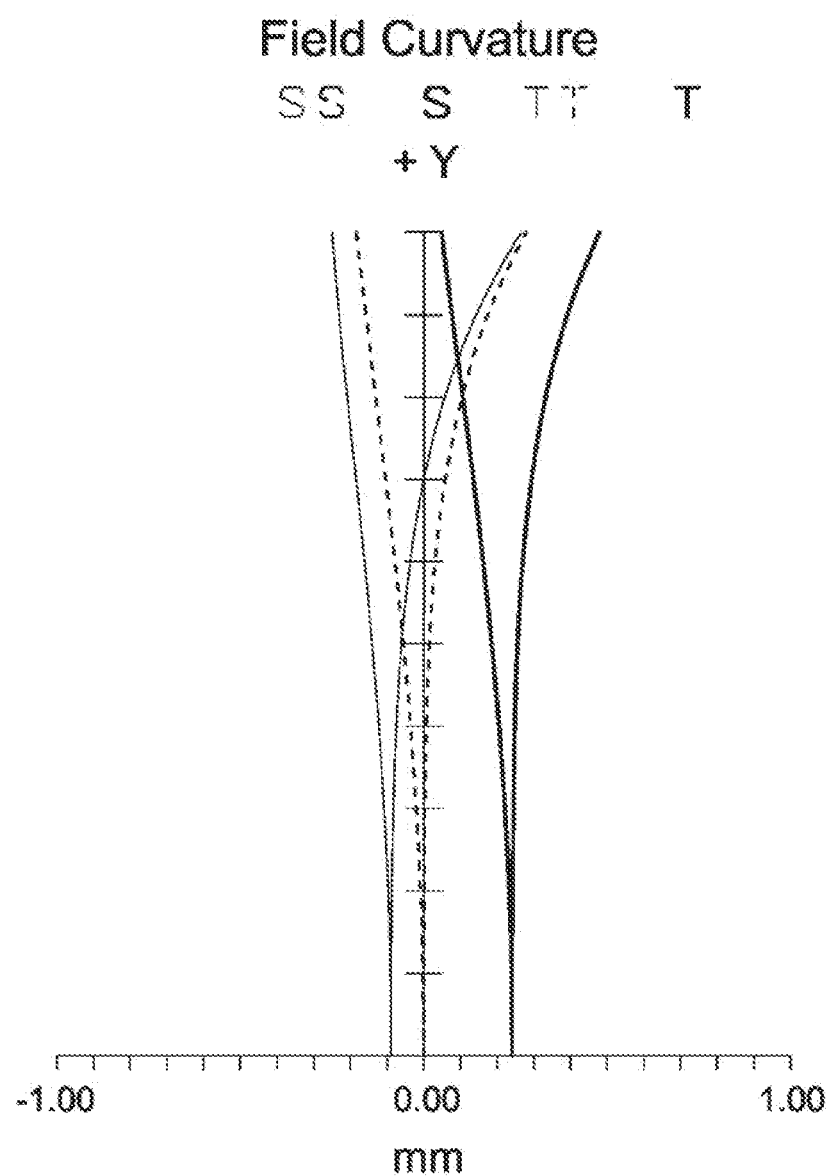
FIG. 4C and FIG. 4D depict a field curvature diagram and a distortion diagram of the scope at maximum magnification in accordance with the second embodiment of the invention, respectively.
Figure 4D:
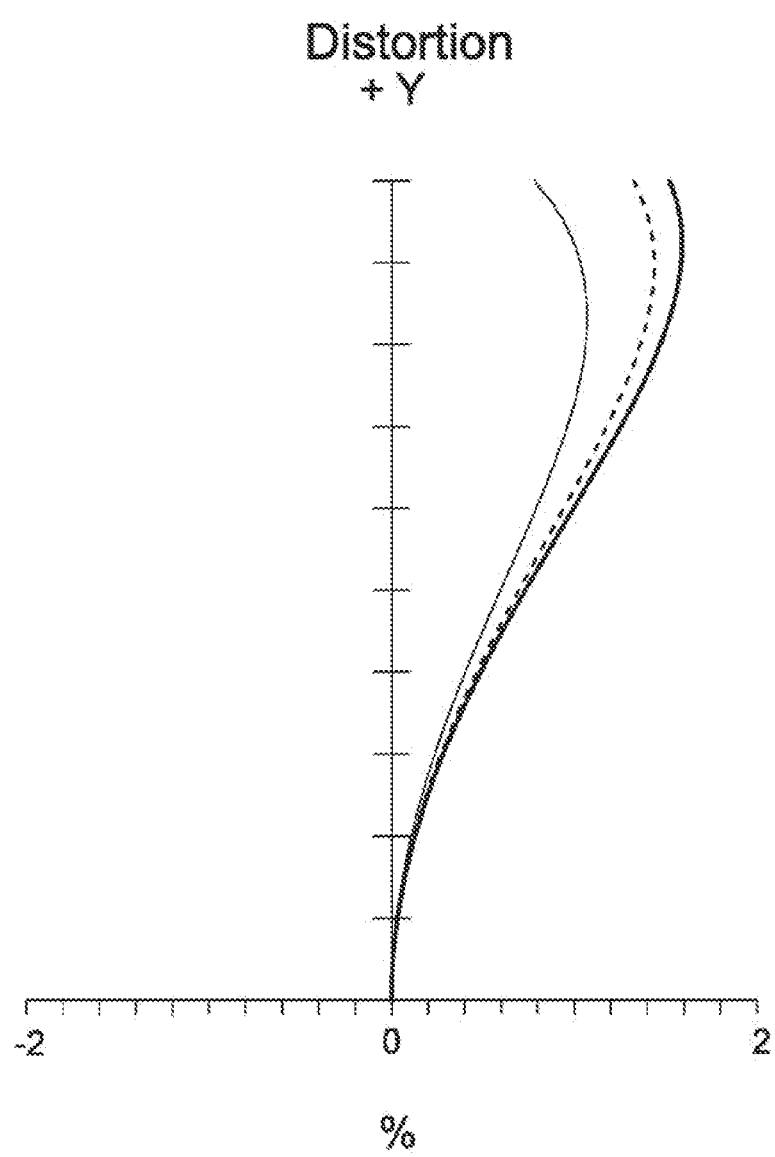

Referring to FIG. 3A and FIG. 3B, FIG. 3A is a lens layout diagram of a scope at minimum magnification in accordance with a second embodiment of the invention and FIG. 3B is a lens layout diagram of a scope at maximum magnification in accordance with the second embodiment of the invention. The scope 2 includes an objective lens system $LG2_{OBJ}$, a relay lens system $LG2_{EL}$, and an eyepiece system $LG2_{EYE}$, all of which are arranged in order from an object side to an image side along an optical axis OA2. The objective lens system $LG2_{OBJ}$ includes a I-5 lens L213, a I-1 lens L21, a I-2 lens L22, a first prism P21, and a second prism P22. The I-1 lens L21 and the I-2 lens L22 are cemented. The relay lens system $LG2_{EL}$ includes a first lens group LG21, a second lens group LG22, and a third lens group LG23, all of which are arranged in order from the object side to the image side along the optical axis OA2. The first lens group LG21 includes a II-1-1 lens L25. The second lens group LG22 includes a II-2-1 lens L26 and a II-2-2 lens L27. The II-2-1 lens L26 and the II-2-2 lens L27 are cemented. The third lens group LG23 includes a II-3-1 lens L28 and a II-3-2 lens L29. The II-3-1 lens L28 and the II-3-2 lens L29 are cemented. The eyepiece system $LG2_{EYE}$ includes a III-1 lens L210, a III-2 lens L211, and a III-3 lens L212. The III-1 lens L210 and the III-2 lens L211 are cemented. The I-5 lens L213, the I-1 lens L21, the I-2 lens L22, the first prism P21, the second prism P22, the II-1-1 lens L25, the II-2-1 lens L26, the II-2-2 lens L27, the II-3-1 lens L28, the II-3-2 lens L29, the III-1 lens L210, the III-2 lens L211, and the III-3 lens L212 are arranged in order from the object side to the image side along the optical axis OA2. The second lens group LG22 and the third lens group LG23 can move along the optical axis OA2 to change an interval of the first lens group LG21 and the second lens group LG22, an interval of the second lens group LG22 and the third lens group LG23, and an interval of the third lens group LG23 and the second image plane IMA22, so that the magnification of the relay lens system $LG2_{EL}$ is changed and thereby changed the magnification of the scope 2. In the second embodiment, the magnification of the relay lens system $LG2_{EL}$ is variable from 1 to 4 times, that is, the minimum magnification is 1 times, and the maximum magnification is 4 times. The objective lens system $LG2_{OBJ}$ has a magnification of 5 times. In operation, the light from the object side first passes through the objective lens group $LG2_{OBJ}$ to be magnified by 5 times, forms an inverted image on the first image plane IMA21, then passes through the relay lens system $LG2_{EL}$ to be magnified by 1 to 4 times, forms an erect image on the second image plane IMA22, and finally passes through the eyepiece system $LG2_R$ and imaged on human's eye. In the second embodiment, the magnification of the scope 2 is 5 times to 20 times.

According to the foregoing, wherein: the I-5 lens L213 is a biconvex lens with positive refractive power and made of glass material, wherein the object side surface S11 is a convex surface, the image side surface S12 is a convex surface, and both of the object side surface S11 and image side surface S12 are spherical surfaces; the I-2 lens L22 is a biconcave lens, wherein the image side surface S25 is a concave surface; the first prism P21 is made of glass material, wherein both of the object side surface S26 and image side surface S27 are plane surfaces; and the second prism P22 is made of glass material, wherein both of the object side surface S28 and image side surface S29 are plane surfaces.

With the above design of the objective lens system $LG2_O$, relay lens system $LG2_{EL}$, eyepiece system $LG2_{EYE}$, and at least one of the conditions (1)-(7) satisfied, the scope 2 can have an effective increased field of view, an effective corrected aberration, and an effective corrected chromatic aberration.

Table 3 shows the optical specification of the scope 2 in FIG. 3A and FIG. 3B.

TABLE 3

| Surface Number | Radius of Curvature (mm) | Thickness (mm) | Nd | Vd | Effective Focal Length (mm) | Remark |
|---|---|---|---|---|---|---|
| S21 | 293.77 | 5 | 1.517 | 64.17 | 285.047 | L213 |
| S22 | −293.77 | 1 | | | | |
| S23 | 116.09 | 7 | 1.497 | 81.61 | 142.765 | L21 |
| S24 | −178.84 | 2 | 1.581 | 40.89 | −168.863 | L22 |
| S25 | 218.6 | 157.911 | | | | |
| S26 | ∞ | 7 | 1.517 | 64.17 | | P21 |
| S27 | ∞ | 19.5 | | | | |
| S28 | ∞ | 19 | 1.517 | 64.17 | | P22 |
| S29 | ∞ | 3 | | | | |
| S210 | ∞ | 10 | | | | IMA21 |
| S211 | ∞ | 4 | 1.517 | 64.2 | 44.602 | L25 |
| S212 | −23.05 | 21.73921 (1× Magnification) 1.81226 (4× Magnification) | | | | |
| S213 | 28.44 | 1 | 1.648 | 33.84 | −28.632 | L26 |
| S214 | 11.07 | 4 | 1.517 | 64.2 | 15.687 | L27 |
| S215 | −26.56 | 26.55932 (1× magnification) 1.23115 (4× Magnification) | | | | |
| S216 | 26.56 | 4 | 1.517 | 64.2 | 15.687 | L28 |
| S217 | −11.07 | 1 | 1.648 | 33.84 | −28.632 | L29 |
| S218 | −28.44 | 25.65853 (1× Magnification) 70.91365 (4× Magnification) | | | | |
| S219 | ∞ | 32.66 | | | | IMA22 |
| S220 | −179.7 | 2.5 | 1.717 | 29.5 | −44.908 | L210 |
| S221 | 39.48 | 11 | 1.517 | 64.2 | 40.100 | L211 |
| S222 | −39.48 | 1 | | | | |
| S223 | 64.22 | 8 | 1.517 | 64.2 | 63.480 | L212 |
| S224 | −64.22 | 90 | | | | |

Table 4 shows the parameters and condition values for conditions (1)-(7) in accordance with the second embodiment of the invention. It can be seen from Table 4 that the scope 2 of the second embodiment satisfies the conditions (1)-(7).

TABLE 4

| FOV | 5-24 degrees | $M_{EL}$ | 1-4 | $TTL_{EYE}$ | 22.5 mm |
|---|---|---|---|---|---|
| $R_{OBJ1}$ | 293.77 mm | $TTL_{OBJ}$ | 218.41 mm | $TTL_{ELMaxM}$ | 17.04341 mm |
| FOV × $M_{EL}$ | 23 degrees | $R_{101}/TTL_{EYE}$ | −7.98667 | $R_{101}/R_{122}$ | 2.798194 |
| $R_{OBJ1}/TTL_{OBJ}$ | 1.345039 | $R_{92}/TTL_{ELMaxM}$ | −1.66868 | $R_{122}/TTL_{EYE}$ | −2.85422 |
| $\mid R_{92}/R_{101} \mid$ | 0.158264 | | | | |

In addition, the scope 2 of the second embodiment can meet the requirements of optical performance as seen in FIGS. 4A-4D. It can be seen from FIG. 4A that the field curvature of tangential direction and sagittal direction in the scope 2 at minimum magnification of the second embodiment ranges from −0.4 mm to 0.1 mm. It can be seen from FIG. 4B that the distortion in the scope 2 at minimum magnification of the second embodiment ranges from 0% to 1.6%. It can be seen from FIG. 4C that the field curvature of tangential direction and sagittal direction in the scope 2 at maximum magnification of the second embodiment ranges from −0.3 mm to 0.5 mm. It can be seen from FIG. 4D that the distortion in the scope 2 at maximum magnification of the second embodiment ranges from 0% to 1.6%. It is obvious that the field curvature and the distortion of the scope 2 of the second embodiment can be corrected effectively. Therefore, the scope 2 of the second embodiment is capable of good optical performance.

Figure 5A:
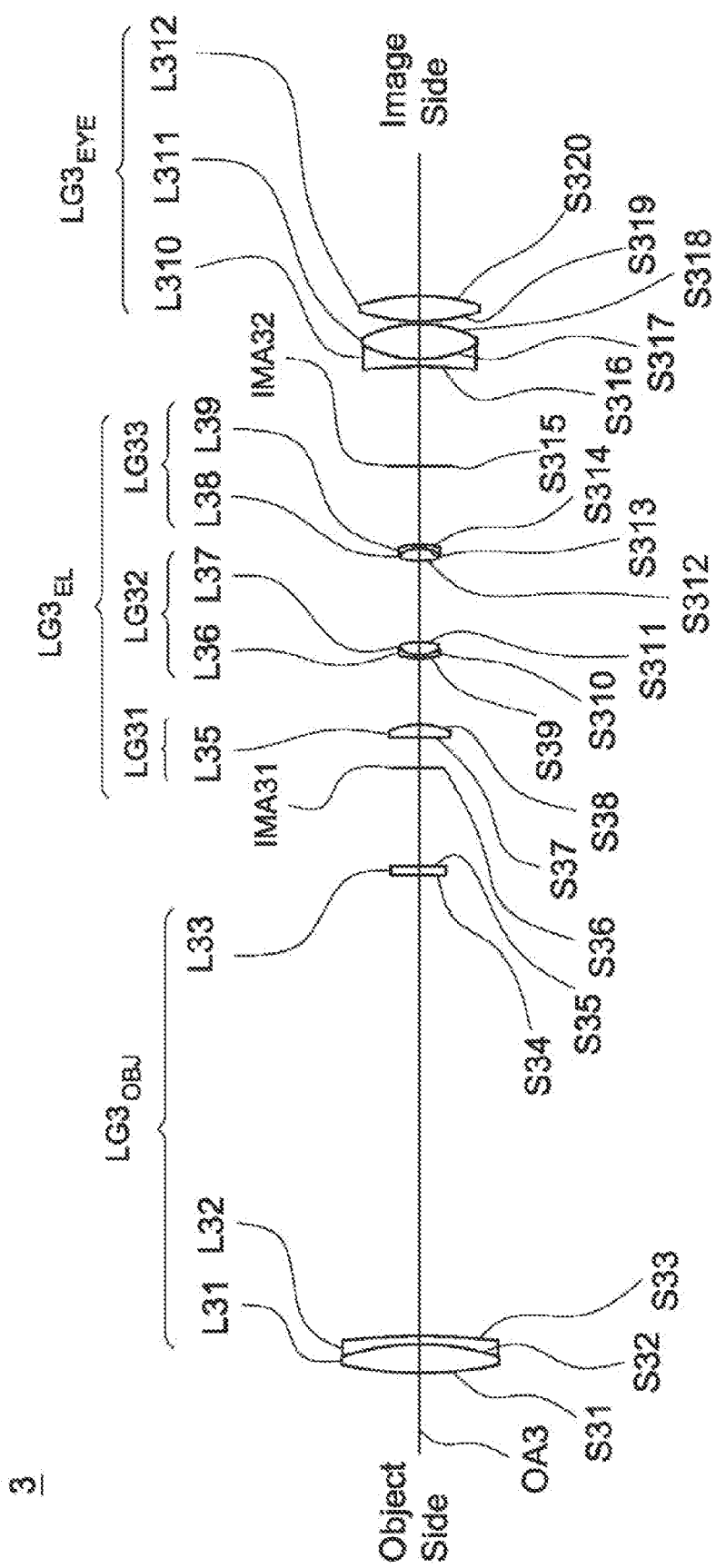
FIG. 5A is a lens layout diagram of a scope at minimum magnification in accordance with a third embodiment of the invention.
Figure 5B:
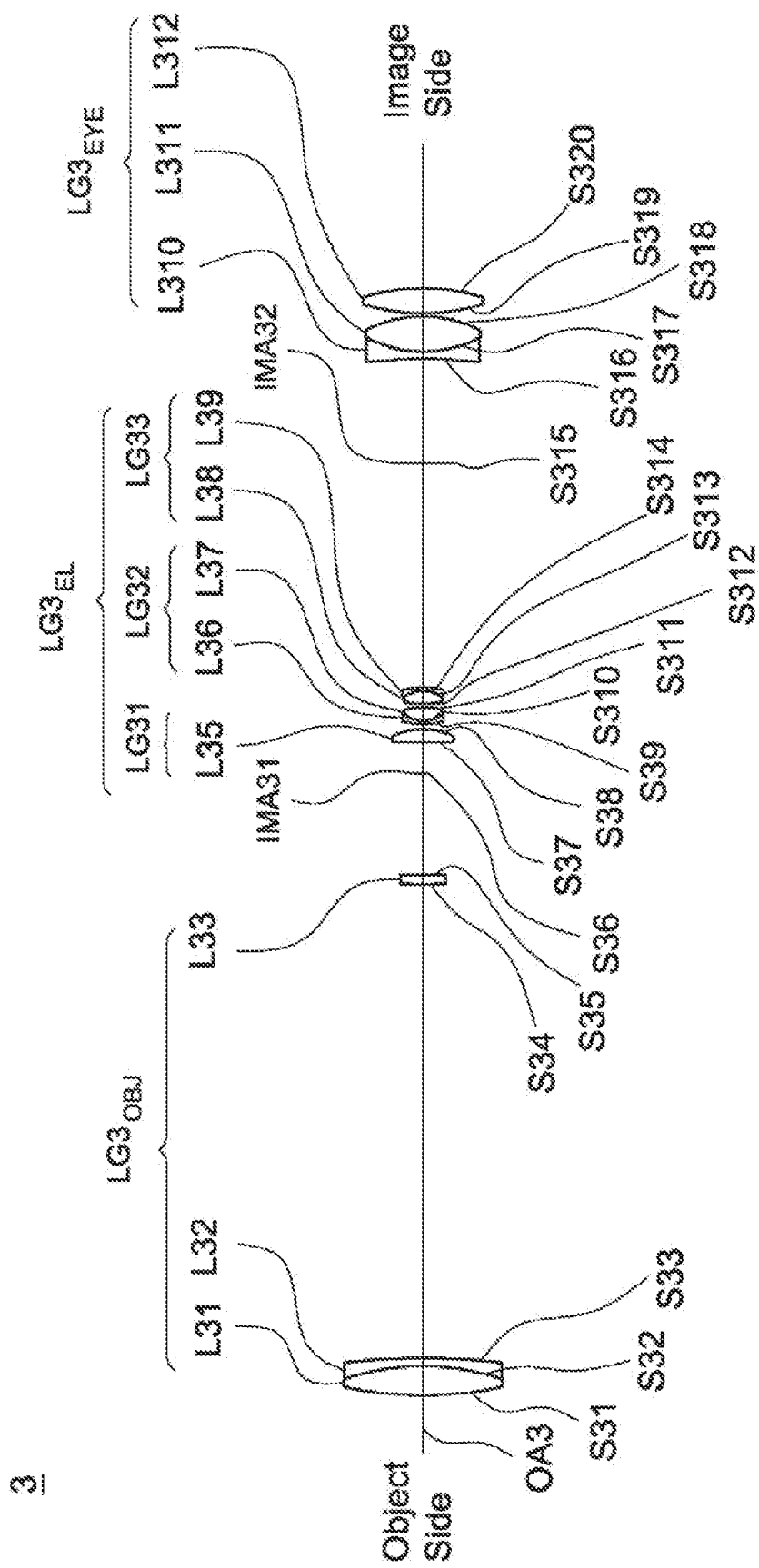
FIG. 5B is a lens layout diagram of a scope at maximum magnification in accordance with the third embodiment of the invention.
Figure 6A:
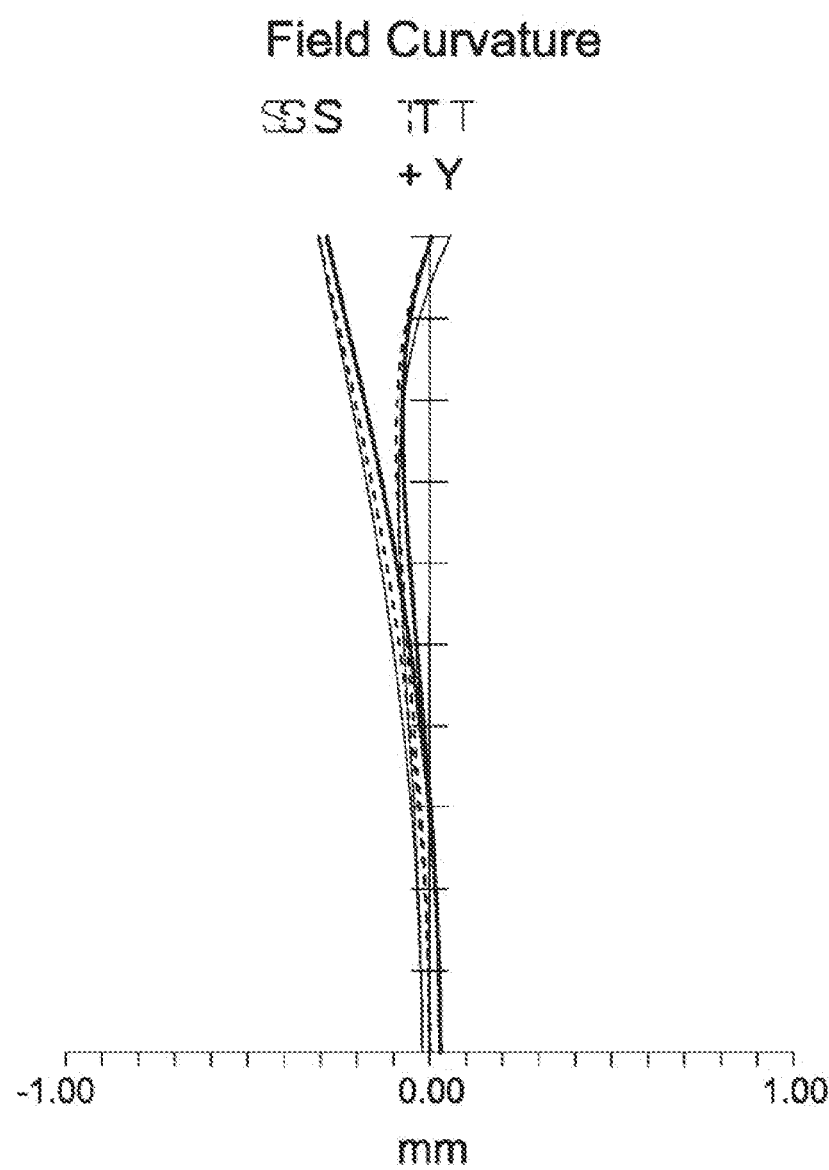
FIG. 6A and FIG. 6B depict a field curvature diagram and a distortion diagram of the scope at minimum magnification in accordance with the third embodiment of the invention, respectively.
Figure 6B:
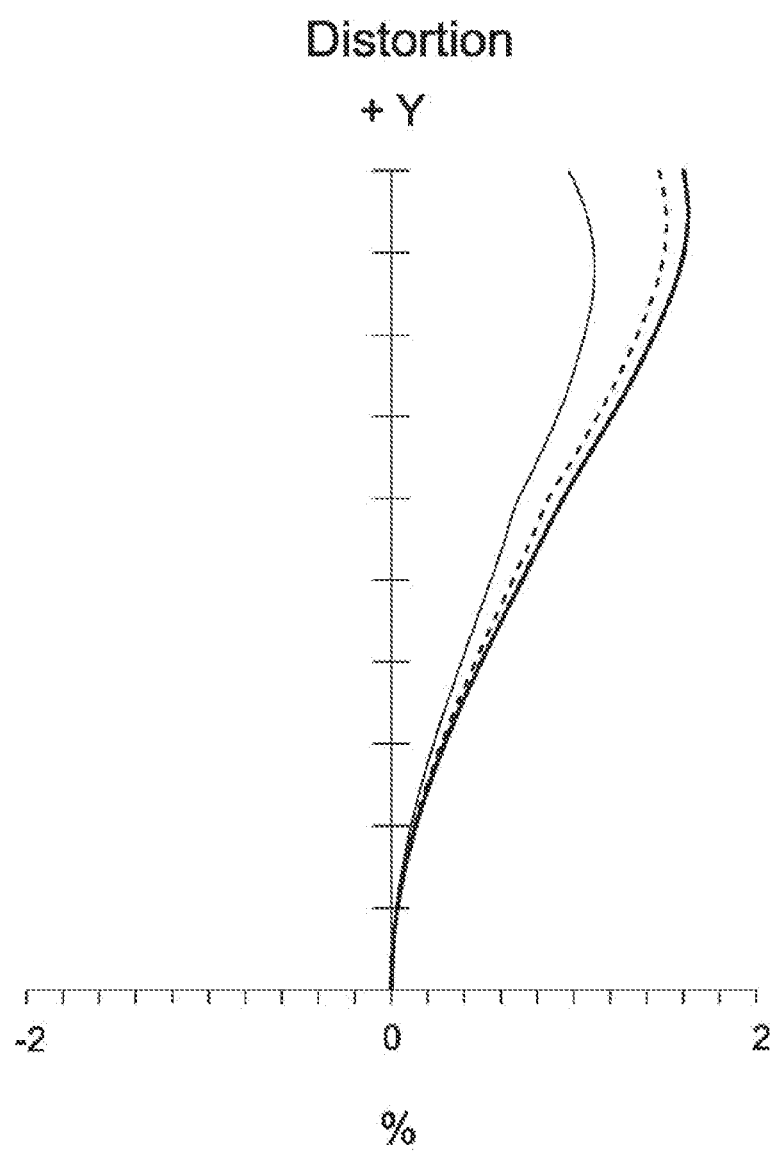
Figure 6C:
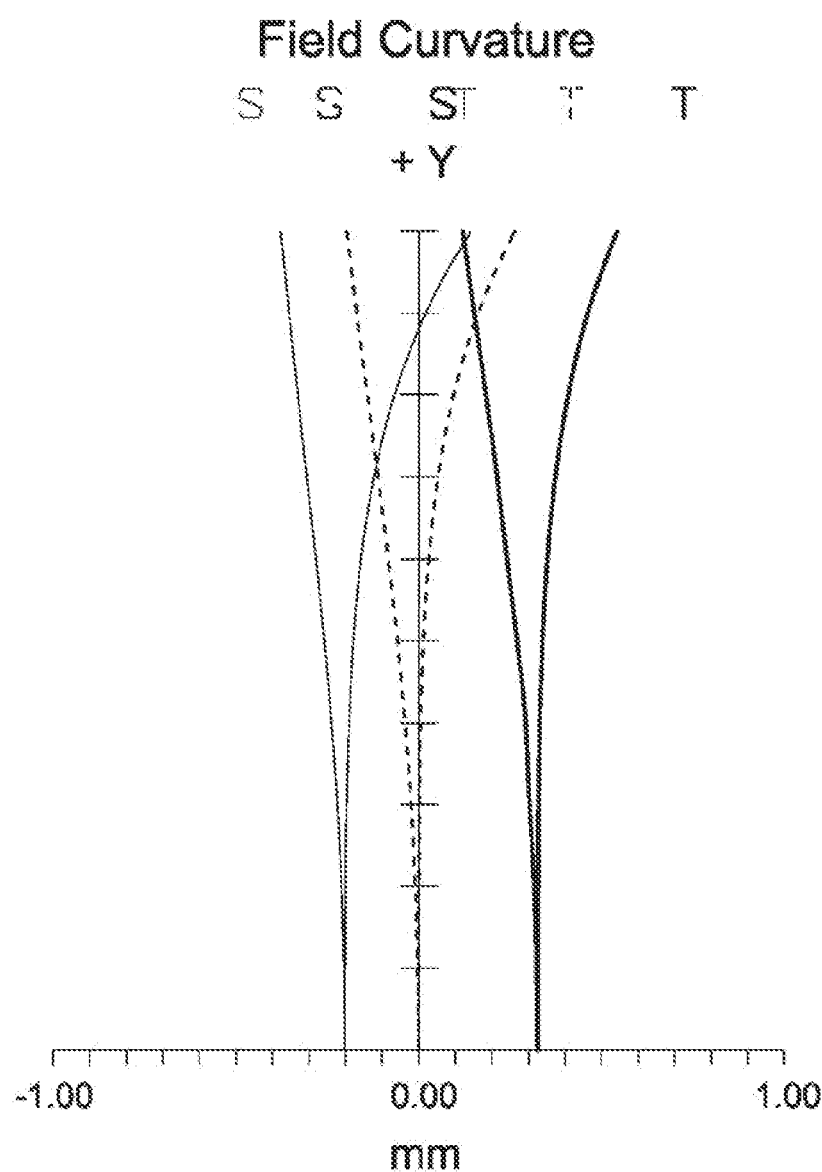
FIG. 6C and FIG. 6D depict a field curvature diagram and a distortion diagram of the scope at maximum magnification in accordance with the third embodiment of the invention, respectively.
Figure 6D:
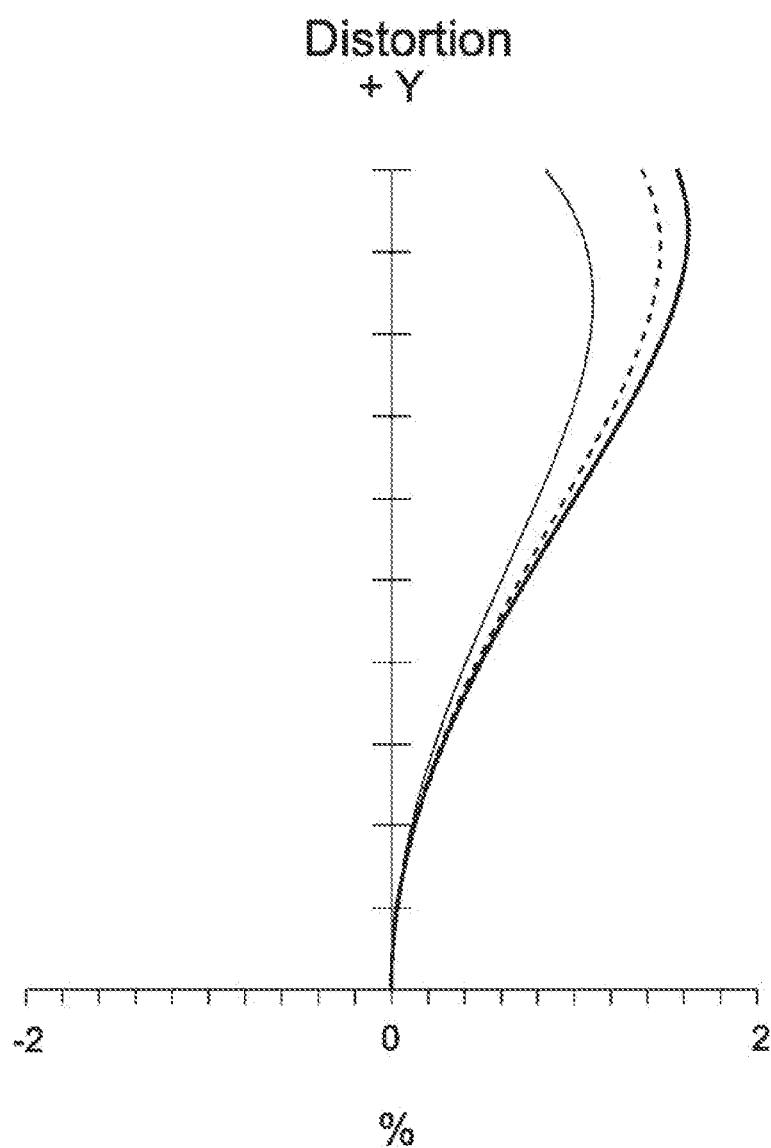

Referring to FIG. 5A and FIG. 5B, FIG. 5A is a lens layout diagram of a scope at minimum magnification in accordance with a third embodiment of the invention and FIG. 5B is a lens layout diagram of a scope at maximum magnification in accordance with the third embodiment of the invention. The scope 3 includes an objective lens system $LG3_{OBJ}$, a relay lens system $LG3_{EL}$, and an eyepiece system $LG3_{EYE}$, all of which are arranged in order from an object side to an image side along an optical axis OA3. The objective lens system $LG3_O$ includes a I-1 lens L31, a I-2 lens L32, and a I-3 lens L33. The I-1 lens L31 and the I-2 lens L32 are cemented. The relay lens system $LG3_E$ includes a first lens group LG31, a second lens group LG32, and a third lens group LG33, all of which are arranged in order from the object side to the image side along the optical axis OA3. The first lens group LG31 includes a II-1-1 lens L35. The second lens group LG32 includes a II-2-1 lens L36 and a II-2-2 lens L37. The II-2-1 lens L36 and the II-2-2 lens L37 are cemented. The third lens group LG33 includes a II-3-1 lens L38 and a II-3-2 lens L39. The II-3-1 lens L38 and the II-3-2 lens L39 are cemented. The eyepiece system $LG3_{EYE}$ includes a III-1 lens L310, a III-2 lens L311, and a III-3 lens L312. The III-1 lens L310 and the III-2 lens L311 are cemented. The I-1 lens L31, the I-2 lens L32, the I-3 lens L33, the II-1-1 lens L35, the II-2-1 lens L36, the II-2-2 lens L37, the II-3-1 lens L38, the II-3-2 lens L39, the III-1 lens L310, the III-2 lens L311, and the III-3 lens L312 are arranged in order from the object side to the image side along the optical axis OA3. The second lens group LG32 and the third lens group LG33 can move along the optical axis OA3 to change an interval of the first lens group LG31 and the second lens group LG32, an interval of the second lens group LG32 and the third lens group LG33, and an interval of the third lens group LG33 and the second image plane IMA32, so that the magnification of the relay lens system $LG3_{EL}$ is changed and thereby changed the magnification of the scope 3. In the third embodiment, the magnification of the relay lens system $LG3_{EL}$ is variable from 1 to 4 times, that is, the minimum magnification is 1 times, and the maximum magnification is 4 times. The objective lens system $LG3_{EL}$ has a magnification of 4 times. In operation, the light from the object side first passes through the objective lens group $LG3_{OBJ}$ to be magnified by 4 times, forms an inverted image on the first image plane IMA31, then passes through the relay lens system $LG3_{EL}$ to be magnified by 1 to 4 times, forms an erect image on the second image plane IMA32, and finally passes through the eyepiece system $LG3_{EYE}$ and imaged on human's eye. In the third embodiment, the magnification of the scope 3 is 4 times to 16 times.

According to the foregoing, wherein: the I-2 lens L32 is a meniscus lens, wherein the image side surface S33 is a convex surface; the I-3 lens L33 is a plane-convex lens with positive refractive power and made of glass material, wherein the object side surface S34 is a convex surface, the image side surface S35 is a plane surface, and the object side surface S34 is a spherical surface.

With the above design of the objective lens system $LG3_{OBJ}$, relay lens system $LG3_{EL}$, eyepiece system $LG3_{EYE}$, and at least one of the conditions (1)-(7) satisfied, the scope 3 can have an effective increased field of view, an effective corrected aberration, and an effective corrected chromatic aberration.

Table 5 shows the optical specification of the scope 3 in FIG. 5A and FIG. 5B.

TABLE 5

| Surface Number | Radius of Curvature (mm) | Thickness (mm) | Nd | Vd | Effective Focal Length (mm) | Remark |
|---|---|---|---|---|---|---|
| S31 | 119.87 | 9 | 1.517 | 64.17 | 95.016 | L31 |
| S32 | −81.05 | 2.5 | 1.648 | 33.79 | −182.108 | L32 |
| S33 | −262.23 | 149.63 | | | | |
| S34 | 140.57 | 3 | 1.589 | 61.14 | 238.614 | L33 |
| S35 | ∞ | 31.89 | | | | |
| S36 | ∞ | 10 | | | | IMA31 |
| S37 | ∞ | 4 | 1.517 | 64.2 | 44.602 | L35 |
| S38 | −23.05 | 21.73921(1× Magnification) 1.81226(4× Magnification) | | | | |
| S39 | 28.44 | 1 | 1.648 | 33.84 | −28.632 | L36 |
| S310 | 11.07 | 4 | 1.517 | 64.2 | 15.687 | L37 |
| S311 | −26.56 | 26.55932(1× Magnification) 1.23115(4× Magnification) | | | | |
| S312 | 26.56 | 4 | 1.517 | 64.2 | 15.687 | L38 |
| S313 | −11.07 | 1 | 1.648 | 33.84 | −28.632 | L39 |
| S314 | −28.44 | 25.65853(1× Magnification) 70.91365(4× Magnification) | | | | |
| S315 | ∞ | 32.66 | | | | IMA32 |
| S316 | −179.7 | 2.5 | 1.717 | 29.5 | −44.908 | L310 |
| S317 | 39.48 | 11 | 1.517 | 64.2 | 40.100 | L311 |
| S318 | −39.48 | 1 | | | | |
| S319 | 64.22 | 8 | 1.517 | 64.2 | 63.480 | L312 |
| S320 | −64.22 | 90 | | | | |

Table 6 shows the parameters and condition values for conditions (1)-(7) in accordance with the third embodiment of the invention. It can be seen from Table 6 that the scope 3 of the third embodiment satisfies the conditions (1)-(7).

TABLE 6

| FOV | 5-24 degrees | $M_{EL}$ | 1-4 | $TTL_{EYE}$ | 22.5 mm |
|---|---|---|---|---|---|
| $R_{OBJ1}$ | 119.87 mm | $TTL_{OBJ}$ | 164.13 mm | $TTL_{ELMaxM}$ | 17.04341 mm |
| FOV × $M_{EL}$ | 23 degrees | $R_{101}/TTL_{EYE}$ | −7.98667 | $R_{101}/R_{122}$ | 2.798194 |
| $R_{OBJ1}/TTL_{OBJ}$ | 0.730336 | $R_{92}/TTL_{ELMaxM}$ | −1.66868 | $R_{122}/TTL_{EYE}$ | −2.85442 |
| \| $R_{92}/R_{101}$ \| | 0.158264 | | | | |

In addition, the scope 3 of the third embodiment can meet the requirements of optical performance as seen in FIGS. 6A-6D. It can be seen from FIG. 6A that the field curvature of tangential direction and sagittal direction in the scope 3 at minimum magnification of the third embodiment ranges from −0.4 mm to 0.1 mm. It can be seen from FIG. 6B that the distortion in the scope 3 at minimum magnification of the third embodiment ranges from 0% to 1.8%. It can be seen from FIG. 6C that the field curvature of tangential direction and sagittal direction in the scope 3 at maximum magnification of the third embodiment ranges from −0.4 mm to 0.6 mm. It can be seen from FIG. 6D that the distortion in the scope 3 at maximum magnification of the third embodiment ranges from 0% to 1.7%. It is obvious that the field curvature and the distortion of the scope 3 of the third embodiment can be corrected effectively. Therefore, the scope 3 of the third embodiment is capable of good optical performance.

Figure 7A:
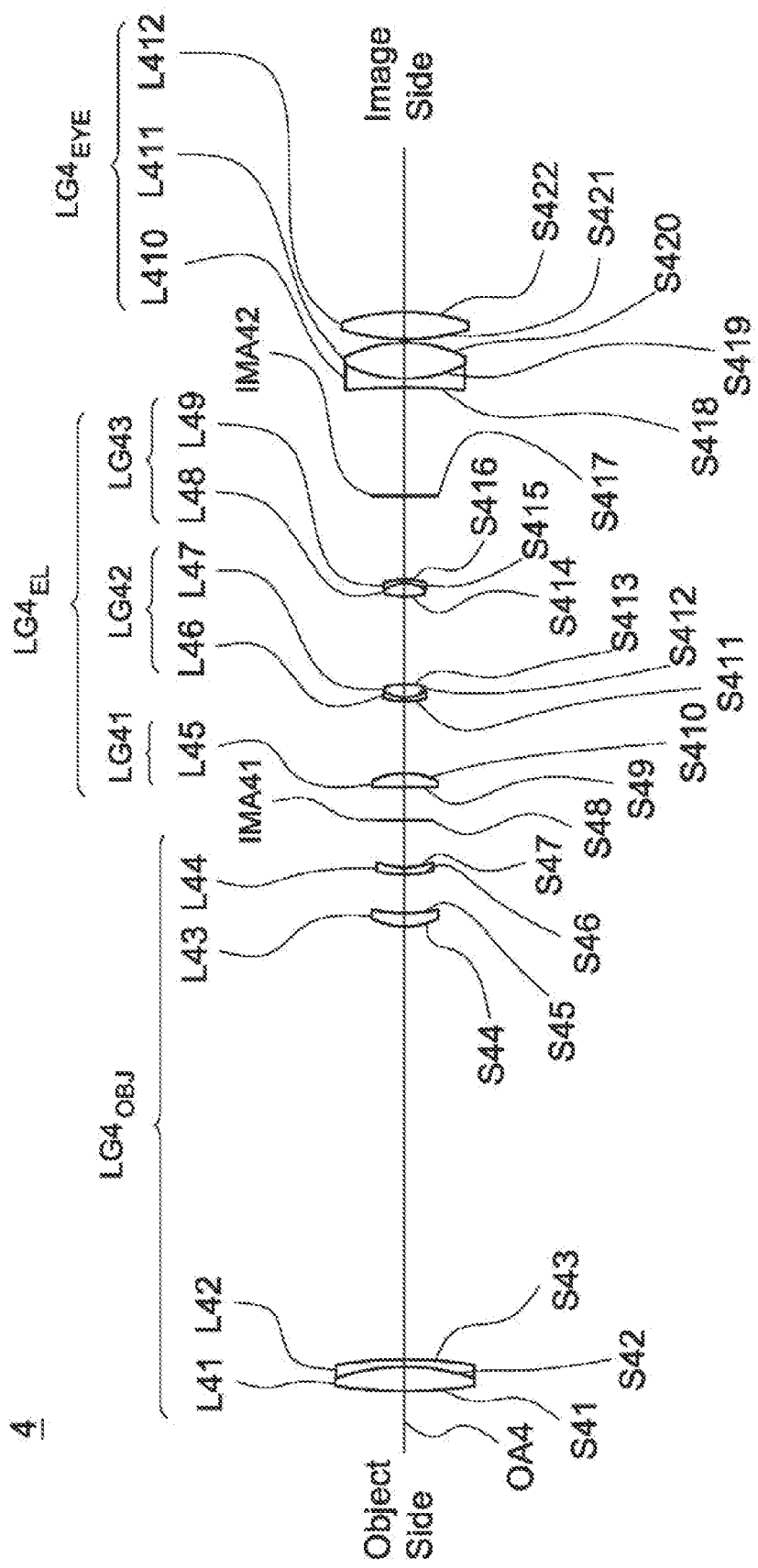
FIG. 7A is a lens layout diagram of a scope at minimum magnification in accordance with a fourth embodiment of the invention.
Figure 7B:
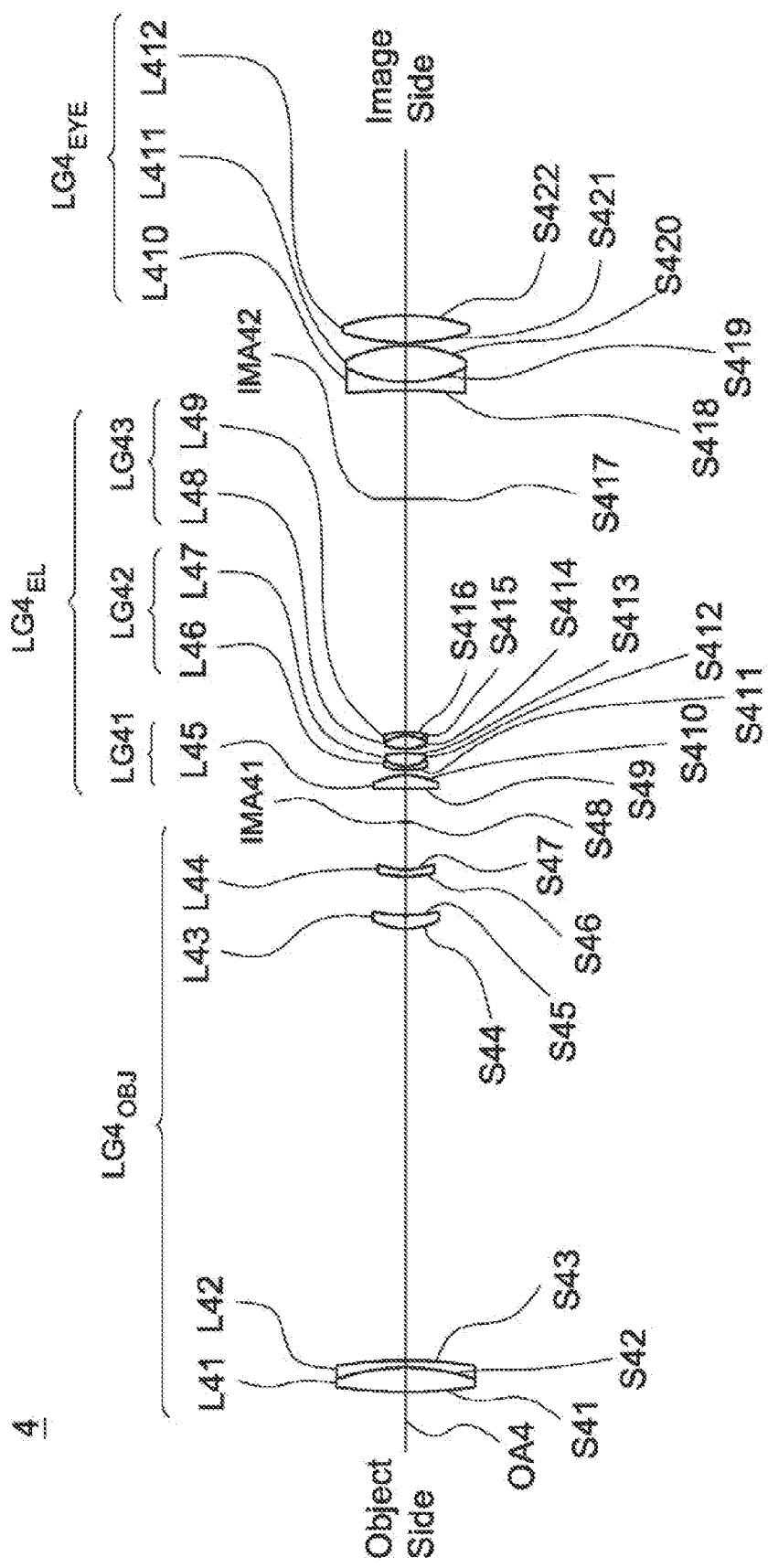
FIG. 7B is a lens layout diagram of a scope at maximum magnification in accordance with the fourth embodiment of the invention.
Figure 8A:
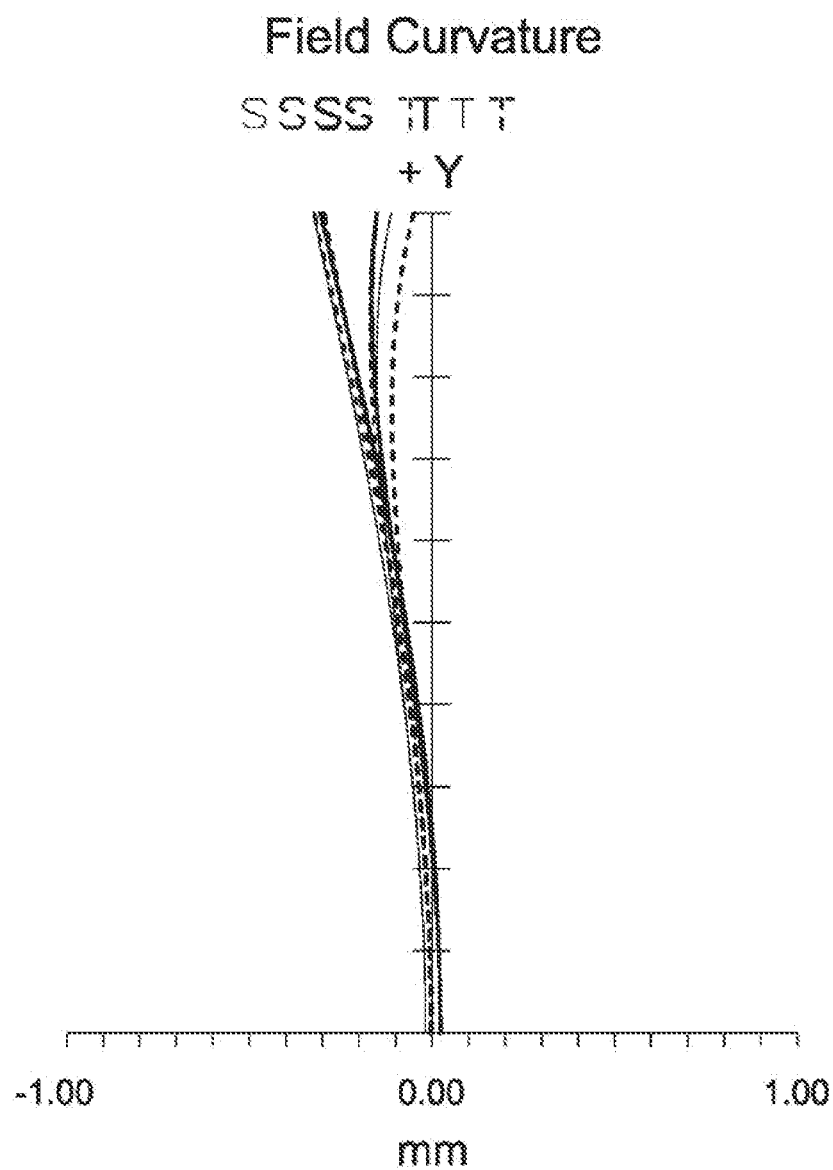
FIG. 8A and FIG. 8B depict a field curvature diagram and a distortion diagram of the scope at minimum magnification in accordance with the fourth embodiment of the invention, respectively.
Figure 8B:
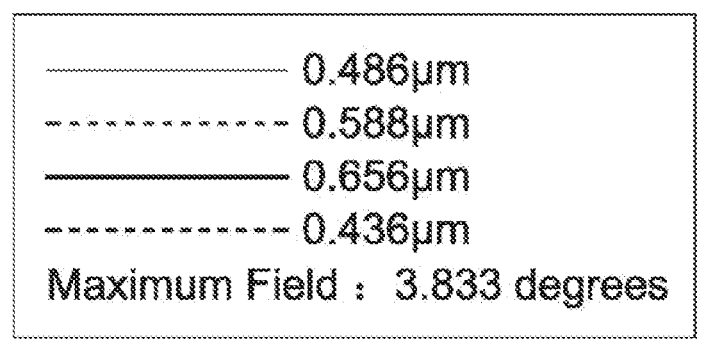
Figure 8B:
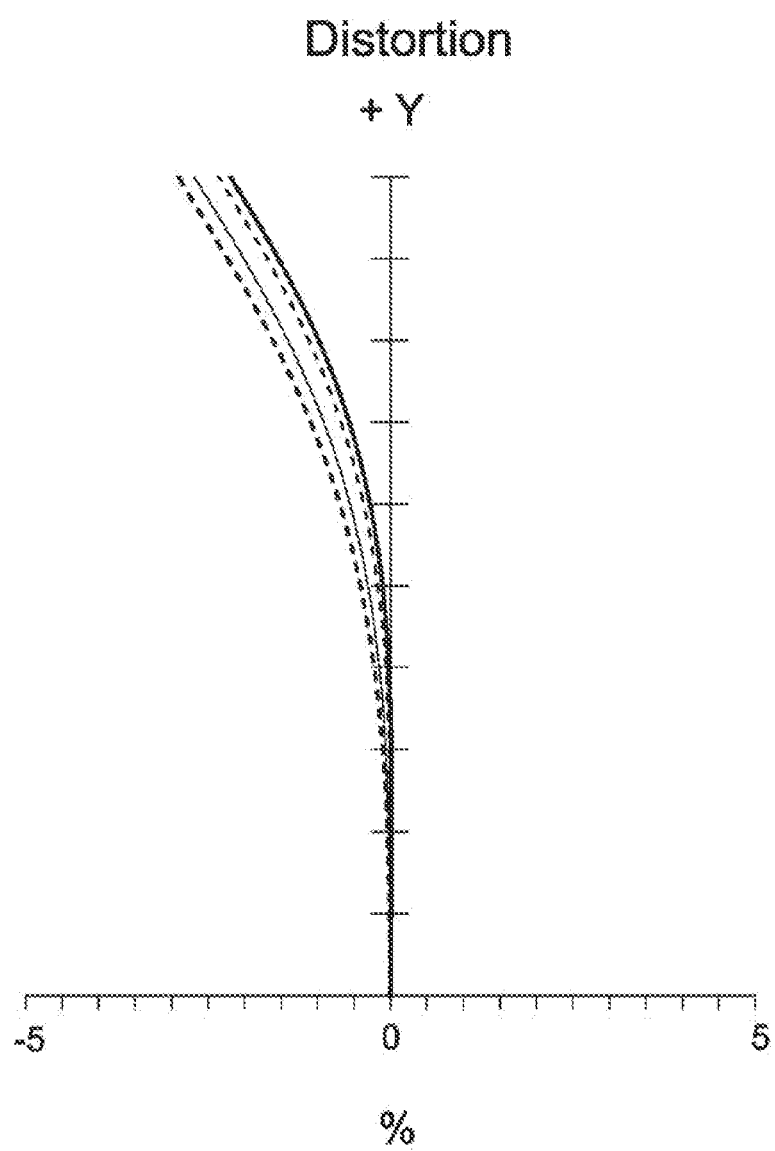
Figure 8C:
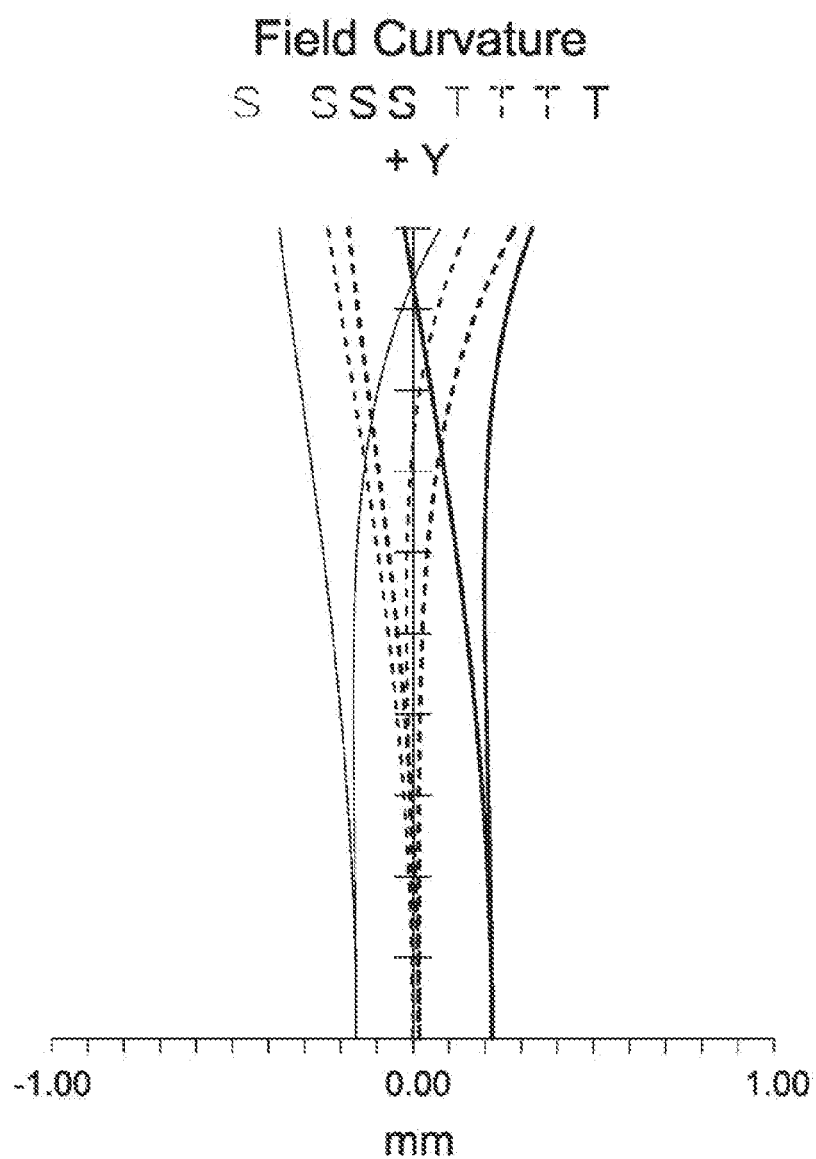
FIG. 8C and FIG. 8D depict a field curvature diagram and a distortion diagram of the scope at maximum magnification in accordance with the fourth embodiment of the invention, respectively.
Figure 8D:
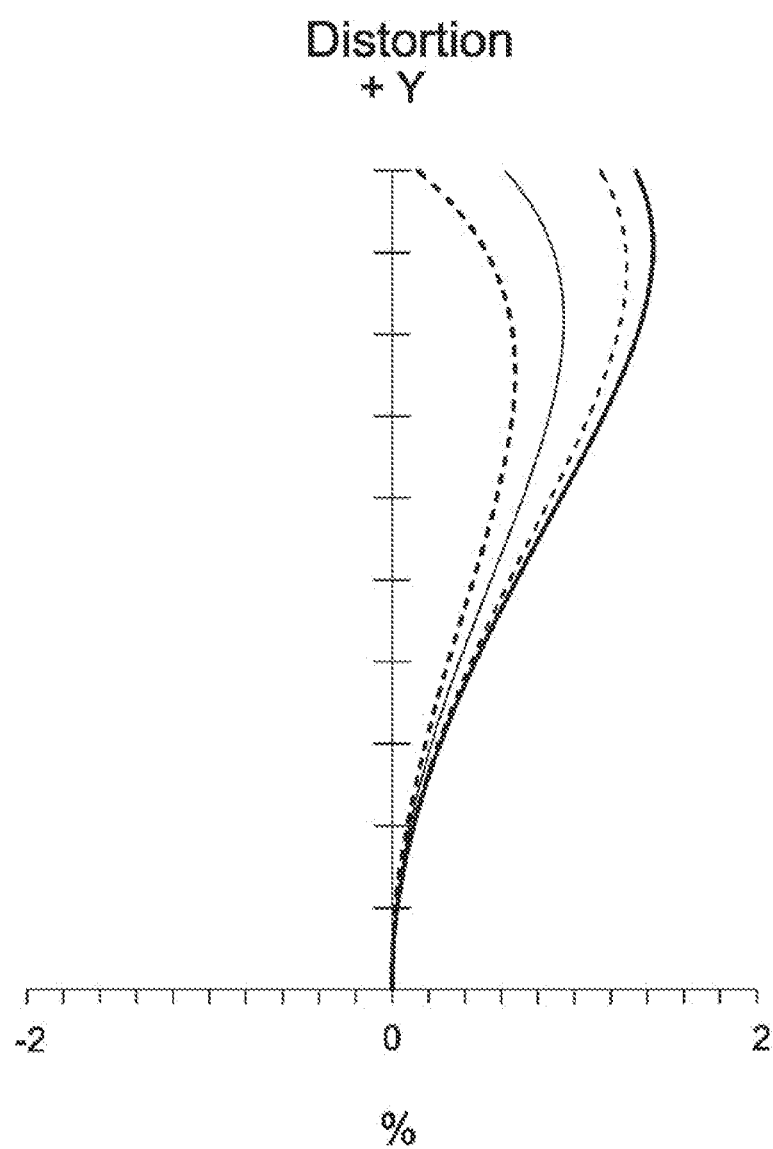

Referring to FIG. 7A and FIG. 7B, FIG. 7A is a lens layout diagram of a scope at minimum magnification in accordance with a fourth embodiment of the invention and FIG. 7B is a lens layout diagram of a scope at maximum magnification in accordance with the fourth embodiment of the invention. The scope 4 includes an objective lens system $LG4_{OBJ}$, a relay lens system $LG4_{EL}$, and an eyepiece system $LG4_{EYE}$, all of which are arranged in order from an object side to an image side along an optical axis OA4. The objective lens system $LG4_{OBJ}$ includes a I-1 lens L41, a I-2 lens L42, a I-3 lens L43, and a I-4 lens L44. The I-1 lens L41 and the I-2 lens L42 are cemented. The relay lens system $LG4_E$, includes a first lens group LG41, a second lens group LG42, and a third lens group LG43, all of which are arranged in order from the object side to the image side along the optical axis OA4. The first lens group LG41 includes a II-1-1 lens L45. The second lens group LG42 includes a II-2-1 lens L46 and a II-2-2 lens L47. The II-2-1 lens L46 and the II-2-2 lens L47 are cemented. The third lens group LG43 includes a II-3-1 lens L48 and a II-3-2 lens L49. The II-3-1 lens L48 and the II-3-2 lens L49 are cemented. The eyepiece system $LG4_{EYE}$ includes a III-1 lens L410, a III-2 lens L411, and a III-3 lens L412. The III-1 lens L410 and the III-2 lens L411 are cemented. The I-1 lens L41, the I-2 lens L42, the I-3 lens L43, the I-4 lens L44, the II-1-1 lens L45, the II-2-1 lens L46, the II-2-2 lens L47, the II-3-1 lens L48, the II-3-2 lens L49, the III-1 lens L410, the III-2 lens L41, and the III-3 lens L412 are arranged in order from the object side to the image side along the optical axis OA4. The second lens group LG42 and the third lens group LG43 can move along the optical axis OA4 to change an interval of the first lens group LG41 and the second lens group LG42, an interval of the second lens group LG42 and the third lens group LG43, and an interval of the third lens group LG43 and the second image plane IMA42, so that the magnification of the relay lens system $LG4_{EL}$ is changed and thereby changed the magnification of the scope 4. In the fourth embodiment, the magnification of the relay lens system $LG4_{EL}$ is variable from 1 to 4 times, that is, the minimum magnification is 1 times, and the maximum magnification is 4 times. The objective lens system $LG3_O$ has a magnification of 3 times.

In operation, the light from the object side first passes through the objective lens group $LG4_{OBJ}$ to be magnified by 3 times, forms an inverted image on the first image plane IMA41, then passes through the relay lens system $LG4_{EL}$ to be magnified by 1 to 4 times, forms an erect image on the second image plane IMA42, and finally passes through the eyepiece system $LG4_{EYE}$ and imaged on human's eye. In the fourth embodiment, the magnification of the scope 4 is 3 times to 12 times.

According to the foregoing, wherein: the I-2 lens L42 is a meniscus lens, wherein the image side surface S43 is a convex surface; the I-3 lens L43 is a meniscus lens with positive refractive power and made of glass material, wherein the object side surface S44 is a convex surface, the image side surface S45 is a concave surface, and both of the object side surface S44 and image side surface S45 are spherical surface; and the I-4 lens L44 is a meniscus lens with negative refractive power and made of glass material, wherein the object side surface S46 is a convex surface, the image side surface S47 is a concave surface, and both of the object side surface S46 and image side surface S47 are spherical surfaces.

With the above design of the objective lens system $LG4_{OBJ}$, relay lens system $LG4_{EL}$, eyepiece system $LG4_{EYE}$, and at least one of the conditions (1)-(7) satisfied, the scope 4 can have an effective increased field of view, an effective corrected aberration, and an effective corrected chromatic aberration.

Table 7 shows the optical specification of the scope 4 in FIG. 7A and FIG. 7B.

TABLE 7

| Surface Number | Radius of Curvature (mm) | Thickness (mm) | Nd | Vd | Effective Focal Length (mm) | Remark |
|---|---|---|---|---|---|---|
| S41 | 137.637 | 7.5 | 1.487 | 70.24 | 91.61 | L41 |
| S42 | −64.93 | 2 | 1.64 | 34.47 | −183.165 | L42 |
| S43 | −147.357 | 130.52 | | | | |
| S44 | 22.16 | 4 | 1.487 | 70.24 | 82.549 | L43 |
| S45 | 46.4 | 11.77 | | | | |
| S46 | 43.94 | 7 | 1.517 | 64.17 | −116.416 | L44 |
| S47 | 25 | 14.45 | | | | |
| S48 | ∞ | 10 | | | | IMA41 |
| S49 | ∞ | 4 | 1.517 | 64.2 | 44.602 | L45 |
| S410 | −23.05 | 21.73921(1× Magnification) 1.81226(4× Magnification) | | | | |
| S411 | 28.44 | 1 | 1.648 | 33.84 | −28.632 | L46 |
| S412 | 11.07 | 4 | 1.517 | 64.2 | 15.687 | L47 |
| S413 | −26.56 | 26.55932(1× Magnification) 1.23115(4× Magnification) | | | | |
| S414 | 26.56 | 4 | 1.517 | 64.2 | 15.687 | L48 |
| S415 | −11.07 | 1 | 1.648 | 33.84 | −28.632 | L49 |
| S416 | −28.44 | 25.65853(1× Magnification) 70.91365(4× Magnification) | | | | |

TABLE 7-continued

| Surface Number | Radius of Curvature (mm) | Thickness (mm) | Nd | Vd | Effective Focal Length (mm) | Remark |
|---|---|---|---|---|---|---|
| S417 | ∞ | 32.66 | | | | IMA42 |
| S418 | −179.7 | 2.5 | 1.717 | 29.5 | −44.908 | L410 |
| S419 | 39.48 | 11 | 1.517 | 64.2 | 40.100 | L411 |
| S420 | −39.48 | 1 | | | | |
| S421 | 64.22 | 8 | 1.517 | 64.2 | 63.480 | L412 |
| S422 | −64.22 | 90 | | | | |

Table 8 shows the parameters and condition values for conditions (1)-(7) in accordance with the fourth embodiment of the invention. It can be seen from Table 8 that the scope 4 of the fourth embodiment satisfies the conditions (1)-(7).

TABLE 8

| FOV | 5-24 degrees | $M_{EL}$ | 1-4 | $TTL_{EYE}$ | 22.5 mm |
|---|---|---|---|---|---|
| $R_{OBJ1}$ | 137.637 mm | $TTL_{OBJ}$ | 157.79 mm | $TTL_{ELMaxM}$ | 17.04341 mm |
| FOV × $M_{EL}$ | 23 degrees | $R_{101}/TTL_{EYE}$ | −7.98667 | $R_{101}/R_{122}$ | 2.798194 |
| $R_{OBJ1}/TTL_{OBJ}$ | 0.87228 | $R_{92}/TTL_{ELMaxM}$ | −1.66868 | $R_{122}/TTL_{EYE}$ | −2.85442 |
| $|R_{92}/R_{101}|$ | 0.158264 | | | | |

In addition, the scope 4 of the fourth embodiment can meet the requirements of optical performance as seen in FIGS. 8A-8D. It can be seen from FIG. 8A that the field curvature of tangential direction and sagittal direction in the scope 4 at minimum magnification of the fourth embodiment ranges from −0.4 mm to 0.1 mm. It can be seen from FIG. 8B that the distortion in the scope 4 at minimum magnification of the fourth embodiment ranges from −3% to 0%. It can be seen from FIG. 8C that the field curvature of tangential direction and sagittal direction in the scope 4 at maximum magnification of the fourth embodiment ranges from −0.4 mm to 0.4 mm. It can be seen from FIG. 8D that the distortion in the scope 4 at maximum magnification of the fourth embodiment ranges from 0% to 1.6%. It is obvious that the field curvature and the distortion of the scope 4 of the fourth embodiment can be corrected effectively. Therefore, the scope 4 of the fourth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scope comprising:
an objective lens system which is with refractive power;
a relay lens system which is with refractive power and comprises a first lens group, a second lens group, and a third lens group; and
an eyepiece system which is with refractive power;
wherein the first lens group is with positive refractive power;
wherein the second lens group comprises a II-2-1 lens and a II-2-2 lens, and both of which are cemented and the II-2-1 lens is a meniscus lens;
wherein the third lens group comprises a II-3-1 lens having a convex surface facing an object side and a II-3-2 lens having a convex surface facing an image side, and both of which are cemented;
wherein the second lens group and the third lens group can move along an optical axis to change a magnification of the relay lens system and thereby change a magnification of the scope;
wherein the objective lens system, the relay lens system, and the eyepiece system are arranged in order from the object side to the image side along the optical axis;
wherein the first lens group, the second lens group, and the third lens group are arranged in order from the object side to the image side along the optical axis;
wherein the II-2-1 lens, the II-2-2 lens, the II-3-1 lens, and the II-3-2 lens are arranged in order from the object side to the image side along the optical axis;
wherein the scope satisfies at least one of following conditions:

$-10 \leq R_{101}/TTL_{EYE} \leq -5$;

$0.5 \leq R_{OBJ1}/TTL_{OBJ} \leq 3$;

$-3 \leq R_{92}/TTL_{ELMaxM} \leq -1$;

$-3.3 \leq R_{122}/TTL_{EYE} \leq -1.8$;

wherein $R_{101}$ is a radius of curvature of an object side surface of the lens closest to the object side in the eyepiece system, $TTL_{EYE}$ is an interval between the object side surface of the lens closest to the object side to an image side surface of the lens closest to the image side along the optical axis in the eyepiece system, $R_{122}$ is a radius of curvature of the image side surface of the lens closest to the image side in the eyepiece system, $R_{OBJ1}$ is a radius of curvature of an object side surface of the lens closest to the object side in the objective lens system, $TTL_{OBJ}$ is an interval from the object side surface of the lens closest to the object side to an image side surface of the lens closest to the image side along the optical axis in the objective lens system, $R_{92}$ is a radius of curvature of an image side surface of the lens closest to the image side in the relay lens system, and $TTL_{ELMaxM}$ is an interval from an object side surface of the lens closest to the object side to the image side surface of the lens closest to the image side along the optical axis in the relay lens system when the magnification of the relay lens system is at maximum.

2. The scope as claimed in claim 1, wherein:
the eyepiece system comprises a III-1 lens, a III-2 lens, and a III-3 lens;
the III-1 lens and the III-2 lens is cemented;
the first lens group comprises a II-1-1 lens, wherein the II-1-1 lens is a plane-convex lens with positive refractive power and comprises a plane surface facing the object side and a convex surface facing the image side;
the second lens group is with positive refractive power;
the II-2-1 lens comprises a convex surface facing the object side and a concave surface facing the image side;
the II-2-2 lens comprises a convex surface facing the object side and another convex surface facing the image side;
the third lens group is with positive refractive power; and the II-3-1 lens comprises a convex surface facing the object side.

3. The scope as claimed in claim 2, wherein the objective lens system comprising:
a I-1 lens; and
a I-2 lens;
wherein the I-1 lens is a biconvex lens with positive refractive power and comprises a convex surface facing the object side and another convex surface facing the image side;
wherein the I-2 lens is with negative refractive power and comprises a concave surface facing the object side;
wherein the I-1 lens and the 1-2 lens are cemented.

4. The scope as claimed in claim 3, wherein the objective lens system further comprises a I-3 lens and a I-4 lens, wherein:
the I-2 lens further comprises a plane surface facing the image side;
the I-3 lens is a plane-concave lens with negative refractive power and comprises a concave surface facing the object side and a plane surface facing the image side;
the I-4 lens is a plane-convex lens with positive refractive power and comprises a convex surface facing the object side and a plane surface facing the image side;
the I-3 lens and the I-4 lens are disposed between the I-2 lens and the relay lens system; and
the I-3 lens and the I-4 lens are arranged in order from the object side to the image side along the optical axis.

5. The scope as claimed in claim 3, wherein the objective lens system further comprises a I-5 lens and two prisms, wherein:
the I-5 lens is disposed between the object side and the I-1 lens, wherein the I-5 lens is a biconvex lens with positive refractive power and comprises a convex surface facing the object side and another convex surface facing the image side;
the I-2 lens further comprises a concave surface facing the image side; and
the prisms are disposed between the I-2 lens and the relay lens system.

6. The scope as claimed in claim 3, wherein the objective lens system further comprises a I-3 lens, wherein:
the I-2 lens further comprises a convex surface facing the image side;
the I-3 lens is a plane-convex lens with positive refractive power and comprises a convex surface facing the object side and a plane surface facing the image side; and
the I-3 lens is disposed between the I-2 lens and the relay lens system.

7. The scope as claimed in claim 3, wherein the objective lens systemfurther comprises a I-3 lens and a I-4 lens, wherein:
the I-2 lens further comprises a convex surface facing the image side;
the I-3 lens is a meniscus lens with positive refractive power and comprises a convex surface facing the object side and a concave surface facing the image side;
the I-4 lens is a meniscus lens with negative refractive power and comprises a convex surface facing the object side and a concave surface facing the image side;
the I-3 lens and the I-4 lens are disposed between the I-2 lens and the relay lens sys e and
the I-3 lens and the I-4 lens are arranged in order from the object side to the image side along the optical axis.

8. The scope as claimed in claim 2, wherein the scope satisfies at least one of following conditions:

$0 \leq |R_{92}/R_{101}| 0.25$;

20 degrees$\leq FOV \times M_{EL} \leq$24 degrees;

wherein $R_{101}$ is the radius of curvature of an object side surface of the lens closest to the object side in the eyepiece system, $R_{122}$ is the radius of curvature of the image side surface of the lens closest to the image side in the eyepiece system, $R_{92}$ is the radius of curvature of an image side surface of the lens closest to the image side in the relay lens system, FOV is a field of view of the scope, and $M_{EL}$ is a magnification of the relay lens system.

9. The scope as claimed in claim 2, wherein:
the eyepiece system is with positive refractive power and a combination of the relay lens system and the eyepiece system is with negative refractive power;
the III-1 lens is with negative refractive power and comprises a concave surface facing the object side;
the III-2 lens is with positive refractive power and comprises a convex surface facing the image side; and
the III-3 lens is a biconvex lens with positive refractive power and comprises a convex surface facing the object side and another convex surface facing the image side.

10. The scope as claimed in claim 2, wherein:
the III-1 lens comprises a concave surface facing the image side;
the III-2 lens comprises a convex surface facing the object side; and
a combination of the III-1 lens and the III-2 lens is with positive refractive power.

11. A scope comprising:
an objective lens system which is with refractive power;
a relay lens system which is with refractive power and comprises a first lens group, a second lens group, and a third lens group; and
an eyepiece system which is with refractive power;
wherein the first lens group is with positive refractive power;
wherein the second lens group is with positive refractive power and comprises a II-2-1 lens having a convex surface facing an object side and a concave surface facing an image side and II-2-2 lens having a convex surface facing the object side and another convex surface facing the image side, and both of which are cemented and the II-2-1 lens is a meniscus lens;
wherein the third lens group is with positive refractive power and comprises II-3-1 lens having a convex surface facing the object side and II-3-2 lens having a convex surface facing an image side, and both of which are cemented;
wherein the second lens group and the third lens group can move along an optical axis to change a magnification of the relay lens system and thereby change a magnification of the scope;
wherein the objective lens system, the relay lens system, and the eyepiece system are arranged in order from the object side to the lage side along the optical axis;
wherein the first lens group, the second lens group, and the third lens group are arranged in order from the object side to the image side along the optical axis;
wherein the II-2-1 lens, the II-2-2 lens, the II-3-1 lens, and the II-3-2 lens are arranged in order from the object side to the image side along the optical axis, wherein the scope satisfies:

20 degrees$\leq FOV \times M_{EL} \leq$24 degrees wherein FOV is a field of view of the scope and $M_{EL}$ is a magnification of the relay lens system.

12. The scope as claimed in claim 11, wherein:
the eyepiece system comprises a III-1 lens, a III-2 lens, and a III-3 lens;
the III-1 lens and the III-2 lens is cemented; and
the first lens group comprises a II-1-1 lens, wherein the II-1-1 lens is a plane-convex lens with positive refractive power and comprises a plane surface facing the object side and a convex surface facing the image side.

13. The scope as claimed in claim 12, wherein the objective lens system comprising:
a I-1 lens; and
a I-2 lens;
wherein the I-1 lens is a biconvex lens with positive refractive power and comprises a convex surface facing the object side and another convex surface facing the image side;
wherein the I-2 lens is with negative refractive power and comprises a concave surface facing the object side;
wherein the I-1 lens and the I-2 lens are cemented.

14. The scope as claimed in claim 13, wherein the objective lens system further comprises a I-3 lens and a I-4 lens, wherein:
the I-2 lens further comprises a plane surface facing the image side;
the I-3 lens is a plane-concave lens with negative refractive power and comprises a concave surface facing the object side and a plane surface facing the image side;
the I-4 lens is a plane-convex lens with positive refractive power and comprises a convex surface facing the object side and a plane surface facing the image side;
the I-3 lens and the I-4 lens are disposed between the I-2 lens and the relay lens system, and
the I-3 lens and the I-4 lens are arranged in order from the object side to the image side along the optical axis.

15. The scope as claimed in claim 13, wherein the objective lens system further comprises a I-5 lens and two prisms, wherein:
the I-5 lens is disposed between the object side and the I-1 lens, wherein the I-5 lens is a biconvex lens with positive refractive power and comprises a convex surface facing the object side and another convex surface facing the image side;
the I-2 lens further comprises a concave surface facing the image side; and
the prisms are disposed between the I-2 lens and the relay lens system.

16. The scope as claimed in claim 13, wherein the objective lens system further comprises a I-3 lens, wherein:
the I-2 lens further comprises a convex surface facing the image side;
the I-3 lens is a plane-convex lens with positive refractive power and comprises a convex surface facing the object side and a plane surface facing the image side; and
the I-3 lens is disposed between the I-2 lens and the relay lens system.

17. The scope as claimed in claim 13, wherein the objective lens system furt e: comprises a I-3 lens and a I-4 lens, wherein:
the I-2 lens further comprises a convex surface facing the image side;
the I-3 lens is a meniscus lens with positive refractive power and comprises a convex surface facing the object side and a concave surface facing the image side;
the I-4 lens is a meniscus lens with negative refractive power and comprises a convex surface facing the object side and a concave surface facing the image side;
the I-3 lens and the I-4 lens are disposed between the I-2 lens and the relay lens syste and
the I-3 lens and the lens are arranged in order from the object side to the image side along the optical axis.

18. The scope as claimed in claim 12, wherein:
the eyepiece system is with positive refractive power and a combination of the relay lens system and the eyepiece system is with negative refractive power;
the III-1 lens is with negative refractive power and comprises a concave surface facing the object side;
the III-2 lens is with positive refractive power and comprises a convex surface facing the image side;
the III-3 lens is a biconvex lens with positive refractive power and comprises a convex surface facing the object side and another convex surface facing the image side; and
the scope satisfies at least one of following conditions:

$-10 \le R_{101}/TTL_{EYE} \le -5$;

$1 \le R_{101}/R_{122} \le 4$;

$0.5 \le R_{OBJ1}/TTL_{OBJ} \le 3$;

$-3 \le R_{92}/TTL_{ELMaxM} \le -1$;

31 $3.3 \le R_{122}/TTL_{EYE} \le -1.8$;

$0 \le |R_{92}/R_{101}| 0.25$;

wherein $R_{101}$ is a radius of curvature of an object side surface of the lens closest to the object side in the eyepiece system, $TTL_{EYE}$ is an interval between the object side surface of the lens closest to the object side to an image side surface of the lens closest to the image side along the optical axis in the eyepiece system, $R_{122}$ is a radius of curvature of the image side surface of the lens closest to the image side in the eyepiece system, $R_{OBJ1}$ is a radius of curvature of an object side surface of the lens closest to the object side in the objective lens system, $TTL_{OBJ}$ is an interval from the object side surface of the lens closest to the object side to an image side surface of the lens closest to the image side along the optical axis in the objective lens system, $R_{92}$ is a radius of curvature of an image side surface of the lens closest to the image side in the relay lens system, and $TTL_{ELMaxM}$ is an interval from an object side surface of the lens closest to the object side to the image side surface of the lens closest to the image side along the optical axis in the relay lens system when the magnification of the relay lens system is at maximum.

19. The scope as claimed in claim 12, wherein:
the III-1 lens comprises a concave surface facing the image side;
the III-2 lens comprises a convex surface facing the object side; and
a combination of the III-1 lens and the lens is with positive refractive power.

20. A scope comprising:
an objective lens system which is with refractive power;
a relay lens system which is with refractive power and comprises a first lens group, a second lens group, and a third lens group; and
an eyepiece system which is with refractive power;
wherein the first lens group is with positive refractive power;

wherein the second lens group comprises a II-2-1 lens and a II-2-2 lens, and both of which are cemented and the II-2-1 lens is a meniscus lens;

wherein the third lens group comprises a II-3-1 lens having a convex surface facing an object side and a II-3-2 lens having a convex surface facing an image side, and both of which are cemented;

wherein the second lens group and the third lens group can move along an optical axis to change a magnification of the relay lens system and thereby change a magnification of the scope;

wherein the objective lens system, the relay lens system, and the eyepiece systemare arranged in order from the object side to the image side along the optical axis;

wherein the first lens group, the second lens group, and the third lens group are arranged in order from the object side to the image side along the optical axis;

wherein the II-2-1 lens, the II-2-2 lens, the II-3-1 lens, and the II-3-2 lens are arranged in order from the object side to the image side along the optical axis;

wherein the eyepiece system omprises a III-1 lens, a III-2 lens, and a III-3 lens;

wherein the III-1 fens is with negative refractive power and comprises a concave surface facing the object side;

wherein the III-2 lens is with positive refractive power and comprises a convex surface facing the image side;

wherein the III-3 lens is a biconvex lens with positive refractive power and comprises a convex surface facing the object side and another convex surface facing the image side.

* * * * *